(12) United States Patent
Aikawa et al.

(10) Patent No.: US 6,813,430 B2
(45) Date of Patent: Nov. 2, 2004

(54) DISPERSION-COMPENSATING OPTICAL FIBER AND HYBRID TRANSMISSION LINE

(75) Inventors: Kazuhiko Aikawa, Sakura (JP); Manabu Saitou, Sakura (JP); Takaaki Suzuki, Sakura (JP); Shoichiro Matsuo, Sakura (JP); Takashi Suzuki, Sakura (JP); Koichi Harada, Sakura (JP); Akira Wada, Sakura (JP)

(73) Assignee: Fujikura, Ltd., Tokyo (JP)

( * ) Notice: Subject to any disclaimer, the term of this patent is extended or adjusted under 35 U.S.C. 154(b) by 482 days.

(21) Appl. No.: 09/795,962

(22) Filed: Feb. 28, 2001

(65) Prior Publication Data

US 2004/0109656 A1 Jun. 10, 2004

(30) Foreign Application Priority Data

| Feb. 29, 2000 | (JP) | P2000-054646 |
| May 29, 2000 | (JP) | P2000-159071 |
| Jul. 17, 2000 | (JP) | P2000-216587 |
| Aug. 9, 2000 | (JP) | P2000-241547 |
| Sep. 1, 2000 | (JP) | P2000-266169 |

(51) Int. Cl.$^7$ .............................. G02B 6/22; G02B 6/02
(52) U.S. Cl. ....................................... 385/127; 398/81
(58) Field of Search ................................ 385/127–128; 398/81

(56) References Cited

U.S. PATENT DOCUMENTS

| 4,715,679 A | 12/1987 | Bhagavatula |
| 5,261,016 A | 11/1993 | Poole |
| 5,361,319 A | 11/1994 | Antos et al. |

(List continued on next page.)

FOREIGN PATENT DOCUMENTS

| AU | 199712467 B2 | 8/1997 | |
| EP | 0 668 520 A2 | 8/1995 | |
| JP | 63-30805 | 2/1988 | |
| JP | 6-11620 | 1/1994 | |
| JP | 7-69667 | 3/1995 | |
| JP | 7-270636 | 10/1995 | |
| JP | 9-127354 | 5/1997 | |
| JP | 9-304640 | 11/1997 | |
| JP | 10-319266 | 12/1998 | |
| JP | 10-325913 | 12/1998 | |
| JP | 11-507445 | 6/1999 | |
| JP | 11-326671 | 11/1999 | |
| JP | 2001159721 A | * 6/2001 | ............ G02B/6/16 |
| JP | 2001-166173 | 6/2001 | |
| WO | WO 00/25158 | 5/2000 | |
| WO | WO 01/01178 | 1/2001 | |

OTHER PUBLICATIONS

"GR–20–Core: Generic Requirements for Optical Fiber and Optical Fiber Cable", Telecordia Technologies, Issue 2, Jul. 1998, Section 2–1.*

Kashiwada, T., et al., "Broadband Dispersion Compensating Module Considering Its Attenuation Spectrum Behavior For WDM System", Optical Fiber Communication Conference and the International Conference on Integrated Optics and Optical Fiber Communication, San Diego, California, Feb. 21–26, 1999, Technical Digest, WM12, pp. 229–231.

(List continued on next page.)

Primary Examiner—Edward J. Glick
Assistant Examiner—Krystyna Suchecki
(74) Attorney, Agent, or Firm—Bell, Boyd & Lloyd LLC

(57) ABSTRACT

In order to provide a dispersion-compensating optical fiber able to be applied over a broad wavelength band, having a large effective area, and as a result, suppressing the occurrence of non-linear effects, the present invention comprises a dispersion-compensating optical fiber that compensates chromatic dispersion of a 1.3 μm single-mode optical fiber over the entire wavelength range of 1.53–1.63 μm characterized in that, chromatic dispersion at a wavelength of 1.55 μm is –50 ps/nm/km or less, the dispersion slope is negative over the entire wavelength range of 1.53–1.63 μm, a cutoff wavelength is provided at which there is substantially single-mode propagation, bending loss is 30 dB/m or less, effective area is 20 μm$^2$ or more, and the absolute value of chromatic dispersion during compensation of the chromatic dispersion of a 1.3 μm single-mode optical fiber serving as the target of compensation is 0.5 ps/nm/km or less.

7 Claims, 9 Drawing Sheets

U.S. PATENT DOCUMENTS

| | | | |
|---|---|---|---|
| 5,448,674 | A | 9/1995 | Vengsarkar et al. |
| 5,555,340 | A | 9/1996 | Onishi et al. |
| 5,568,583 | A | 10/1996 | Akasaka et al. |
| 5,673,354 | A | 9/1997 | Akasaka et al. |
| 5,680,491 | A | 10/1997 | Shigematsu et al. |
| 5,701,188 | A | 12/1997 | Shigematsu et al. |
| 5,740,297 | A | 4/1998 | Onishi et al. |
| 5,742,723 | A | 4/1998 | Onishi et al. |
| 5,781,673 | A | 7/1998 | Reed et al. |
| 5,799,123 | A | 8/1998 | Oyobe et al. |
| 5,802,234 | A | 9/1998 | Vengsarkar et al. |
| 5,802,235 | A | 9/1998 | Akasaka |
| 5,838,867 | A | 11/1998 | Onishi et al. |
| 5,887,093 | A | 3/1999 | Hansen et al. |
| 5,887,104 | A | 3/1999 | Sugizaki et al. |
| 5,933,561 | A | 8/1999 | Sugizaki |
| 5,995,694 | A | 11/1999 | Akasaka et al. |
| 5,999,679 | A | 12/1999 | Antos et al. |
| 6,009,221 | A | 12/1999 | Tsuda |
| 6,021,245 | A | 2/2000 | Berger et al. |
| 6,031,955 | A | 2/2000 | Mukasa et al. |
| 6,055,081 | A | 4/2000 | Koyano et al. |
| 6,556,755 | B2 * | 4/2003 | Tsukitani et al. ........... 385/123 |
| 2003/0021561 | A1 * | 1/2003 | Berkey et al. .............. 385/123 |

OTHER PUBLICATIONS

Tsuritani et al., "1 Tbit/s (100 × 10.7 Gbit/s) Transoceanic Transmission Using 30 nm–Wide Broadband Optical Repeaters with Aeff–Enlarged Positive Dispersion Fiber and Slope–Compensating DCF," 25th European Conference On Optical Communication, PD2–8, Nice, France, Sep. 26–30, 1999, pp. 38–39.

Lars Grunar–Nielsen, et al., "Design and manufacture of dispersion compensating fibre for simultaneous compensation of dispersion and dispersion slope" Optical Fiber Communication Conference and the International Conference on Integrated Optics and Optical Fiber Communication, San Diego, California, Feb. 21–26, 1999, Technical Digest, WM13, pp. 232–234.

Berkey, et al., "Negative slope dispersion compensating fibers", Optical Fiber Communication Conference and the International Conference on Integrated Optics and Optical Fiber Communication, San Diego, California, Feb. 21–26, 1999, Technical Digest, WM14, pp. 235–237.

Aikawa, K., et al., "Single–Mode Optical Fiber With Large Effective Core Area," The Institute of Electronics, Information and Communication Engineers, Society Conference 1999, Lectures, Aug 16, 1999, C–3–77, p. 183.

Suzuki, T., et al., "Dispersion Compensating Fiber with Negative Dispersion Slope and Large Effective Core Area," The Institute of Electronics, Information and Communication Engineers, General Conference 2000, Lectures, Electronics 1, Mar. 7, 2000, C–3–42, p. 221.

Onishi, M., et al., "Dispersion–Compensating Optical Fiber," Sumitomo Electric Technical Review No. 145, Sep. 1994, (7 pgs.).

* cited by examiner

DISPERSION-COMPENSATING OPTICAL FIBER AND HYBRID TRANSMISSION LINE

BACKGROUND OF THE INVENTION

1. Field of the Invention

The present invention relates to a dispersion-compensating optical fiber and an optical transmission path. The present specification is based on patent applications filed in Japan (Japanese Patent Application No. 2000-54646, Japanese Patent Application No. 2000-159071, Japanese Patent Application No. 2000-216587, Japanese Patent Application No. 2000-241547 and Japanese Patent Application No. 2000-266169), and the contents described in said Japanese patent applications are incorporated as a part of the present specification.

2. Background Art

Optical communication systems that transmit at the 1.55 $\mu$m wavelength band (the so-called C-band: typically covering a range of about 1.53–1.57 $\mu$m) are used practically by combining single-mode optical fibers for transmission such as a "1.3 $\mu$m band dispersion single-mode optical fiber having nearly zero chromatic dispersion at a wavelength of 1.3 $\mu$m" or a "standard single-mode optical fiber", and dispersion-compensating optical fibers.

For example, since the chromatic dispersion of a 1.3 $\mu$m single-mode optical fiber is roughly +17 ps/nm/km (positive chromatic dispersion) at a wavelength of 1.55 $\mu$m, when this is used to perform optical communications in the 1.55 $\mu$m wavelength band, considerable chromatic dispersion occurs. In contrast, since dispersion-compensating optical fibers have negative chromatic dispersion in which the absolute value in the 1.55 $\mu$m wavelength band is comparatively large, by combining these in the manner described above, the chromatic dispersion that occurs in ordinary 1.3 $\mu$m single-mode optical fibers extending, for example, for several tens of kilometers, can be compensated by a dispersion-compensating optical fiber having a comparatively short used length.

In addition, since the dispersion slope of a 1.3 $\mu$m single-mode optical fiber in the 1.55 $\mu$m wavelength band is roughly +0.06 ps/nm$^2$/km (positive value), in order to compensate according to this dispersion slope with the chromatic dispersion, it is preferable to use a dispersion-compensating optical fiber having a negative dispersion slope. If dispersion slope can be compensated, this can also be used in applications involving transmission of a plurality of pulsed light having different wavelengths as in the manner of high-density wavelength division multiplexing transmission (DWDM transmission).

On the other hand, transmission characteristics deteriorate when non-linear effects occur in optical fibers. In the case of propagating high-power signal light in the manner of optical communication systems using wavelength division multiplexing transmission and an optical amplifier that have already been used practically in particular, due to the high power density, non-linear effects tend to occur easily, resulting in the need for technology that suppress non-linear effects.

Although methods for suppressing non-linear effects have been proposed, including a method in which the non-linear refractive index of the optical fiber is decreased by reducing the amount of Ge, F or other dopant doped to the core, and a method in which Brillouin scattering, which is one of the non-linear effects, is suppressed by changing the outer diameter of the optical fiber when drawing from the fiber base material, enlargement of the effective area (which may be abbreviated as Aeff) of the optical fiber is a particularly effective method.

However, in the above-mentioned dispersion-compensating optical fibers of the prior art, although such optical fibers have been developed which attempt to improve the so-called performance index (FOM; Figure of Merit), which indicates the amount of chromatic dispersion per unit loss, while also being able to compensate the dispersion slope, it has been difficult to simultaneously realize these characteristics along with enlargement of Aeff.

In addition, a system that performs optical communication in the so-called L-band (1.57–1.63 $\mu$m), which is of a longer wavelength than the C-band that has been used in the past, has recently been examined. Wavelength bands used for optical transmission at present or in the future are reaching or will reach a broad range of 1.45–1.63 $\mu$m, which includes the so-called S-band (1.45–1.53 $\mu$m).

Thus, although a dispersion-compensating optical fiber is required that is able to compensate the chromatic dispersion and dispersion slope of single-mode optical fibers for transmission in not only the C-band, but also other wavelength bands such as the S-band and L-band, conventional dispersion-compensating optical fibers have been unable to adequately satisfy this requirement. Consequently, these optical fibers have been inadequate particularly in applications to wavelength multiplexing, high-speed, long-distance transmission and so forth.

In addition, although large Aeff is also simultaneously required in these wavelength bands, conventional dispersion-compensating optical fibers were unable to accommodate this requirement as well.

Moreover, dispersion-compensated optical fibers are required to have single-mode propagation at the used wavelength band and bending loss that is small enough to allow practical use.

In addition, these dispersion-compensating optical fibers of the dispersion slope-compensating type have conventionally been incorporated in optical communication systems in the form of modules by being housed in, for example, a suitable case. Recently however, studies have been conducted that attempt to form the dispersion-compensating optical fiber itself into a cable and insert it into the transmission path, and several of these attempts have been reported.

This is because, if a dispersion-compensating optical fiber itself was able to be used as a transmission path, since it would be possible to eliminate the arranging space of the module, while also being able to substantially shorten the length of the optical fiber through which the optical signals are transmitted, the transmission characteristics of the overall system could be improved.

However, although reports have been made regarding dispersion-compensating optical fibers of the dispersion slope-compensating type that place the emphasis on compensation of chromatic dispersion and dispersion slope as well as reduction of loss, there have been no effective studies or reports made regarding enlargement of Aeff.

Suppression of non-linear effects is essential for achieving the faster speeds, longer distances and wavelength multiplexing described above, and in the case of inserting a dispersion-compensating optical fiber of the dispersion slope-compensating type in the form of a transmission path, there are cases in which it is difficult to achieve practical use unless Aeff is provided to an extent that is able to effectively suppress non-linear effects.

In addition, dispersion-compensating optical fibers of the prior art required that, for example, the refractive index of the core center be larger than that of an ordinary single-mode optical fiber, and had the problem of increasing the amount of dopant doped to the core center.

Normally, a core center is formed from quartz glass doped with a dopant such as germanium etc. that provides the action of increasing refractive index, while the cladding provided around an outer periphery of the core is formed from pure quartz glass or fluorine-doped quartz glass, etc.

In addition, the glass transition point of the quartz glass decreases proportional to the amount of dopant doped. Thus, if the amount of dopant doped increases, since the difference in viscosities of the core and cladding increases when the fiber base material is heated and melted to draw the optical fiber, the drawing rate and drawing temperature are restricted from the viewpoint of mechanical strength, thereby resulting in the problem of being unable to obtain a dispersion-compensating optical fiber with low loss.

In addition, if the refractive index of the core center is high, Aeff tends to decrease. This results in greater susceptibility to the occurrence of non-linear effects, thereby leading to the problem of deterioration of transmission characteristics.

However, in the dispersion-compensating optical fibers of the prior art, optical fibers realizing chromatic dispersion and dispersion slope compensating effects while enabling the refractive index of the core center to be comparatively small have been unable to be obtained, resulting in problems in terms of ease of production, low loss and non-linearity, etc.

In addition, if Aeff is enlarged in an example of a dispersion-compensating optical fiber of the prior art, the absolute value of chromatic dispersion tends to become smaller, resulting in the problem of the length for compensating single-mode optical fibers for transmission becoming excessively long.

SUMMARY OF THE INVENTION

The object of the present invention is to provide a dispersion-compensating optical fiber that can be applied to a wide wavelength band, has a large Aeff, and as a result, is resistant to the occurrence of non-linear effects.

Moreover, the object of the present invention is to achieve at least one of the following first through fifth objects after having achieved this object.

A first object of the present invention is to provide a dispersion-compensating optical fiber that is able to guarantee chromatic dispersion of a 1.3 $\mu$m single-mode optical fiber over the entire wavelength range of 1.53–1.63 $\mu$m, while also being able to guarantee single-mode propagation and have small bending loss.

Moreover, another object is to provide a dispersion-compensating optical fiber that is able to simultaneously compensate dispersion slope.

Moreover, another object is to provide a dispersion-compensating optical fiber having a large Aeff that is able to suppress non-linear effects.

A second object of the present invention is to provide a dispersion-compensating optical fiber of the dispersion slope-compensating type that is able to realize low loss and low non-linearity while maintaining the inherent function of compensating chromatic dispersion and dispersion slope.

More specifically, the object is to provide a dispersion-compensating optical fiber provided with a large Aeff in order to realize low non-linearity.

A third object of the present invention is to provide a dispersion-compensating optical fiber having large Aeff and low loss.

In addition, an object is to provide a dispersion-compensating optical fiber for which the difference in viscosities between the core and cladding during drawing is small.

More specifically, the object is to provide a dispersion-compensating optical fiber that is able to make the relative refractive index difference based on the cladding of the highest layer of the core comparatively small, while also decreasing the amount of dopant doped to this layer.

A fourth object of the present invention is to provide a technology for obtaining a dispersion-compensating optical fiber of the dispersion slope-compensating type having low loss. In addition, an object is to lower bending loss independent of the used wavelength band, without significantly impairing other characteristics, in comparison with dispersion-compensating optical fibers of the prior art.

Moreover, an object is to realize a dispersion-compensating optical fiber suitable for long-distance transmission that is able to suppress the chromatic dispersion value and dispersion slope value at a specific length.

A fifth object of the present invention is to provide a dispersion-compensating optical fiber that is able to compensate chromatic dispersion of a single-mode optical fiber for transmission over a wide wavelength band.

In addition, an object is to provide a dispersion-compensating optical fiber that is able to enlarge Aeff and suppress non-linear effects.

Moreover, an object is to provide a dispersion-compensating optical fiber in which the length required for compensating single-mode optical fibers for transmission, while preventing the absolute value of chromatic dispersion from becoming small even if Aeff is enlarged, is comparatively short.

In order to achieve the above first object, the dispersion-compensating optical fiber of a first embodiment of the present invention is a dispersion-compensating optical fiber that compensates chromatic dispersion of a 1.3 $\mu$m single-mode optical fiber over the entire wavelength range of 1.53–1.63 $\mu$m wherein, chromatic dispersion at a wavelength of 1.55 $\mu$m is −50 ps/nm/km or less, the dispersion slope is negative over the entire wavelength range of 1.53–1.63 $\mu$m, a cutoff wavelength is provided at which there is substantially single-mode propagation over the entire wavelength range of 1.53–1.63 $\mu$m, bending loss is 30 dB/m or less over the entire wavelength range of 1.53–1.63 $\mu$m, Aeff is 20 $\mu$m$^2$ or more over the entire wavelength range of 1.53–1.63 $\mu$m, and the absolute value of chromatic dispersion during compensation of the chromatic dispersion of a 1.3 $\mu$m single-mode optical fiber serving as the target of compensation is 0.5 ps/nm/km or less over the entire wavelength range of 1.53–1.63 $\mu$m.

In addition, in order to achieve the above second object, the dispersion-compensating optical fiber of a second embodiment of the present invention characterized in that, in a used wavelength band selected from 1.53 to 1.63 $\mu$m, Aeff is 30 $\mu$m$^2$ or more, bending loss is 40 dB/m or less, chromatic dispersion is −40 to −10 ps/nm/km, the absolute value of chromatic dispersion over the entire transmission path connected to a single-mode optical fiber for transmission provided with positive chromatic dispersion is 4.0 ps/nm/km or less, the absolute value of dispersion slope over the entire transmission path is 0.03 ps/nm$^2$/km or less, and a cutoff wavelength is provided that allows substantially single-mode propagation at the used length in the above transmission path.

In order to achieve the above third object, the dispersion-compensating optical fiber of a third embodiment of the present invention is characterized in that, a core and a cladding provided around an outer periphery of said cladding are provided, said core is provided with a central core portion having a refractive index higher than said cladding, an intermediate core portion provided around an outer periphery of said central core portion having a refractive index lower than said cladding, and a ring core portion provided around an outer periphery of said intermediate core portion having a refractive index higher than said cladding, when radii and relative refractive index differences based on the cladding of the central core portion, the intermediate core portion and the ring core portion are expressed as $(a,\Delta_1)$, $(b,\Delta_2)$ and $(c,\Delta_3)$, respectively, a is 2–3 $\mu$m, $\Delta_1$ is 0.9 to 1.5%, $\Delta_2$ is −0.30 to −0.45%, $\Delta_3$ is 0.2 to 1.2%, b/a is 2.0 to 3.5, and c/a is 3.0 to 5.0, in a used wavelength band selected from 1.53 to 1.63 $\mu$m, Aeff is 20 $\mu$m$^2$ or more, bending loss is 40 dB/m or less, chromatic dispersion is −65 to −45 ps/nm/km, and a cutoff wavelength is provided that allows substantially single-mode propagation, and the compensation rate of dispersion slope when compensating a single-mode optical fiber, at a length at which chromatic dispersion of said single-mode optical fiber having a zero dispersion wavelength at a wavelength shorter than the above used wavelength band can be compensated to zero, is 80–120%.

In order to achieve the above fourth object, the dispersion-compensating optical fiber of a fourth embodiment of the present invention is characterized in that, a core and cladding provided around an outer periphery of said core are provided, said core is provided with a central core portion having a refractive index higher than said cladding, an intermediate core portion provided around an outer periphery of said central core portion having a refractive index lower than said cladding, a ring core portion provided around an outer periphery of said intermediate core portion having a refractive index higher than said cladding, and a side ring core portion provided around an outer periphery of said ring core portion having a refractive index lower than said cladding, in a used wavelength band selected from 1.45 to 1.63 $\mu$m, chromatic dispersion is −70 to −45 ps/nm/km, chromatic dispersion slope is negative, Aeff is 20 $\mu$m$^2$ or more, and a cutoff wavelength is provided that allows substantially single-mode propagation, and when a single-mode optical fiber is compensated at a length at which chromatic dispersion of this single-mode optical fiber having zero dispersion at a wavelength shorter than said used wavelength band can be compensated to zero, the compensation rate of dispersion slope defined as RDS(DCF)/RDS (single-mode optical fiber)×100, when the value obtained by dividing the dispersion slope of the single-mode optical fiber by chromatic dispersion of the single-mode optical fiber is taken to be RDS (single-mode optical fiber), and the value obtained by dividing the dispersion slope of the dispersion-compensating optical fiber by chromatic dispersion of the dispersion-compensating optical fiber is taken to be RDS (DCF), is 80–120%, and bending loss at a wavelength of 1.63 $\mu$m is 50 dB/m or less.

Furthermore, RDS is the abbreviation of relative dispersion slope.

In order to achieve the above fifth object, the dispersion-compensating optical fiber as claimed in a fifth embodiment of the present invention is characterized in that, a core and a cladding provided around an outer periphery of said core are provided, said core is provided with a central core portion having a refractive index higher than said cladding, an intermediate core portion provided around an outer periphery of said central core portion having a refractive index lower than said cladding, and a ring core portion provided around an outer periphery of said intermediate core portion having a refractive index higher than said cladding, at a wavelength of 1.55 $\mu$m, chromatic dispersion is −40 ps/nm/km or less and −65 ps/nm/km or more, chromatic dispersion slope is negative, Aeff is 18 $\mu$m$^2$ or more, bending loss is 50 dB/m or less, and the cutoff wavelength allows substantially single-mode propagation, and the chromatic dispersion of a hybrid transmission line combined with a single-mode optical fiber for transmission for which in 1.55 $\mu$m, Aeff is 40 $\mu$m$^2$ or more, chromatic dispersion is positive, and the cutoff wavelength allows substantially single-mode propagation is −0.5 ps/nm/km or more and +0.5 ps/nm/km or less at a used wavelength band over a continuous range of 0.06 $\mu$m or more selected from a wavelength range of 1.45–1.63 $\mu$m.

In the first embodiment of the present invention, a dispersion-compensating optical fiber can be provided that is able to compensate chromatic dispersion and dispersion slope of a 1.3 $\mu$m single-mode optical fiber over the entire range of 1.53–1.63 $\mu$m and compensate single-mode propagation while having low bending loss, large Aeff and is able to suppress non-linear effects.

In the second embodiment of the present invention, a dispersion-compensating optical fiber of the dispersion slope-compensating type can be provided that is able to realize low loss and low non-linearity while maintaining its inherent function of compensating chromatic dispersion and dispersion slope.

In the third embodiment of the present invention, a dispersion-compensating optical fiber having low loss can be obtained by drawing at lower tension than that of the prior art to since the relative refractive index difference of a layer provided with the highest refractive index of a core is small, and non-linear effects can be Suppressed by enlarging Aeff.

In addition, the dispersion-compensating optical fiber of a third embodiment of the present invention is able to construct a hybrid transmission line suitable for wavelength division multiplexing transmission, long-distance transmission and so forth by combining with a single-mode optical fiber.

The dispersion-compensating optical fiber of the fourth embodiment of the present invention is able to reduce the difference in softening temperature and hardening temperature between a central core portion and a cladding, and reduce the difference in viscosity at its drawing temperature during drawing by forming the entire portion, and particularly the cladding, from quartz glass containing dopant.

As a result, the stress remaining in the central core portion and so forth after drawing can be reduced, and even if drawn at a temperature at which practical mechanical strength is obtained, deterioration of transmission loss can be reduced, making it possible to provide a dispersion-compensating optical fiber of the dispersion slope-compensating type, while also having low loss.

The dispersion-compensating optical fiber of the fifth embodiment of the present invention is able to compensate chromatic dispersion of a single-mode optical fiber for transmission over a wide wavelength band, while also being able to enlarge Aeff and suppress non-linear effects. Accordingly, a hybrid transmission line can be provided that is suitable for wavelength division multiplexing transmission and long-distance, high-speed transmission.

In addition, since the absolute value of chromatic dispersion is not reduced excessively even if Aeff is enlarged, chromatic dispersion can be compensated of a single-mode optical fiber for transmission at a comparatively short used length.

BRIEF DESCRIPTION OF THE DRAWINGS

FIG. 8A is a graph showing the relationship between wavelength and chromatic dispersion of a dispersion-compensating optical fiber and single-mode optical fiber for transmission in Embodiment 5-1, while

FIG. 9A is a graph showing the relationship between wavelength and chromatic dispersion of a dispersion-compensating optical fiber and single-mode optical fiber for transmission in Embodiment 5-2, while

FIG. 10A is a graph showing the relationship between wavelength and chromatic dispersion of a dispersion-compensating optical fiber and single-mode optical fiber for transmission in Comparative Example 5-1, while

DESCRIPTION OF THE PREFERRED EMBODIMENTS

Figure 1:
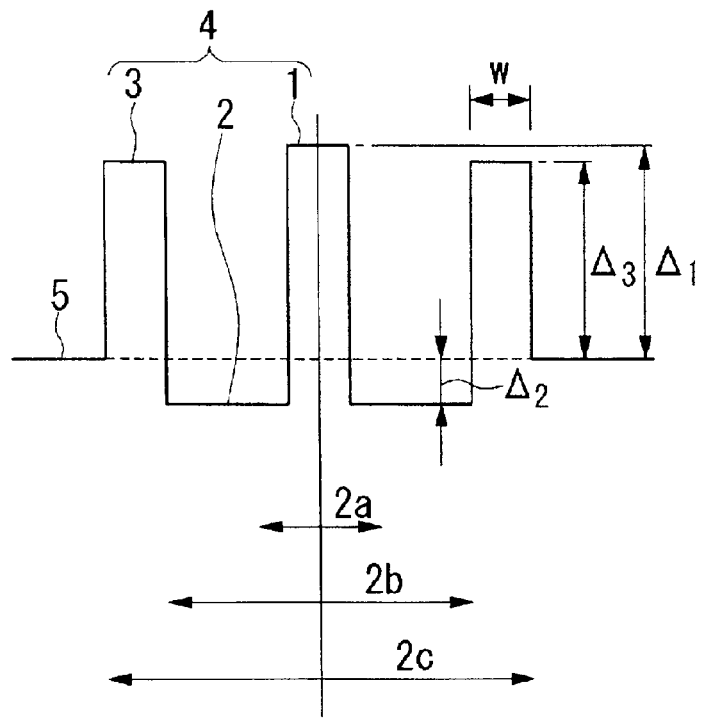
FIG. 1 is a drawing showing an example of a segment core refractive index distribution pattern representing the refractive index distribution of dispersion-compensating optical fibers of the first, second, third and fifth embodiments of the present invention.

The following provides a detailed explanation of the present invention.

To begin with, an explanation is provided of a first embodiment.

First Embodiment

The dispersion-compensating optical fiber of a first embodiment of the present invention is able to compensate dispersion slope of a 1.3 μm single-mode optical fiber by having a negative value for dispersion slope at a wavelength of 1.53–1.63 μm. Since the optimum value of dispersion slope of a dispersion-compensating optical fiber varies according to the dispersion slope and used length of the 1.3 μm single-mode optical fiber to be compensated, although there are no particular restrictions, it is preferably, for example, about −0.15 to −0.25 ps/nm²/km.

In addition, since a dispersion-compensating optical fiber compensates a single-mode optical fiber, it is necessary to perform single-mode propagation at all times over the entire wavelength range of 1.53–1.63 μm. Furthermore, in the actual state of long-distance use, single-mode propagation is possible even if the cutoff wavelength according to the 2m-method recommended in CCITT-G.652 is longer than 1.53 μm. Thus, in consideration of the used length and so forth, the cutoff wavelength must be a value that substantially guarantees single-mode propagation in the actual state of use.

Bending loss refers to the value under conditions in which bending radius (2R) is 20 mm.

If bending loss is 30 dB/m or less over the entire wavelength range of 1.53–1.63 μm, this is desirable since this results in resistance to deterioration of optical characteristics even due to bending applied during fiber laying and so forth.

Effective area Aeff is defined with the following relational expression:

$$Aeff = \frac{2\pi\left\{\int_0^\infty r|E(r)|^2 dr\right\}^2}{\int_0^\infty r|E(r)|^4 dr}$$

r: radius, E(r): electric field strength at radius r

If Aeff is less than 20 μm² over the entire wavelength range of 1.53–1.63 μm, non-linear effects cannot be adequately decreased. Furthermore, since it is preferable that Aeff be as large as possible from the viewpoint of suppressing non-linear effects, although there are no particular restrictions on it, it is substantially 30 μm² or less from the viewpoint of production ease and so forth.

In the dispersion-compensating optical fiber of a first embodiment of the present invention, the absolute value of overall chromatic dispersion when a 1.3 μm single-mode optical fiber to be compensated is combined with a dispersion-compensating optical fiber is 0.5 ps/nm or less over the entire wavelength range of 1.53–1.63 μm. As a result, chromatic dispersion of a 1.3 μm single-mode optical fiber can be compensated over the entire C and L-bands.

Here, the length and chromatic dispersion of a 1.3 μm single-mode optical fiber used in optical communication systems and so forth varies according to the application and so forth.

Thus, the preferable used length and chromatic dispersion of a dispersion-compensating optical fiber is suitably determined by the used length and chromatic dispersion of the 1.3 μm single-mode optical fiber to be compensated.

However, in the dispersion-compensating optical fiber of a first embodiment of the present invention, the chromatic dispersion is required to be −50 ps/nm/km or less at a wavelength of 1.55 μm. In the case the chromatic dispersion is larger than −50 ps/nm/km and approaches zero, there are disadvantages such as the used length of the dispersion-compensating optical fiber becoming long during compensation of a 1.3 μm single-mode optical fiber over the entire wavelength range of 1.53–1.63 μm.

Furthermore, in a dispersion-compensating optical fiber of the prior art, even if a dispersion-compensating optical fiber is attempted to be designed to match the conditions of 1.3 μm single-mode optical fibers in this manner, satisfactory characteristics were unable to be obtained particularly in the L-band. In contrast, the dispersion-compensating optical fiber of a first embodiment of the present invention is characterized by being able to adequately compensate chromatic dispersion of a 1.3 μm single-mode optical fiber in the L-band as well.

For example, when using a 1.3 μm single-mode optical fiber having chromatic dispersion of +21 ps/nm/km at 1.63 μm over a distance of 10 km, if the chromatic dispersion of a dispersion-compensating optical fiber at 1.63 μm is about −74 ps/nm/km, this dispersion-compensating optical fiber is able to compensate chromatic dispersion of this 1.3 μm single-mode optical fiber by using over a distance of 2.84 km.

As has been described above, although there are no particular restrictions on the chromatic dispersion and used length of a 1.3 μm single-mode optical fiber since they vary according to the application, the chromatic dispersion of a 1.3 μm single-mode optical fiber at 1.53–1.63 μm is normally about 16–22 ps/nm/km. In addition, the used length of the dispersion-compensating optical fiber of a first embodiment of the present invention is set to about ⅙ to ⅓ the used length of a 1.3 μm single-mode optical fiber. If the used length is less than ⅙, there are cases in which chromatic dispersion is unable to be adequately compensated, and if the used length exceeds ⅓, there are cases in which transmission characteristics deteriorate.

A dispersion-compensating optical fiber that satisfies these characteristic values is able to compensate chromatic dispersion and dispersion slope of a 1.3 μm single-mode optical fiber over a wide wavelength band of 1.53–1.63 μm that combines the C-band and L-band, has low bending loss and is resistant to the occurrence of non-linear effects. It is preferable that these characteristics be satisfied in the L-band in particular.

A first condition for the dispersion-compensating optical fiber of a first embodiment of the present invention having the above characteristics is possession of the refractive index distribution shown in FIG. 1.

This refractive index distribution pattern is provided with a core 4 and a cladding 5 provided around an outer periphery of the core 4. This core 4 is provided with a three layers structure consisting of the central core portion 1 provided in the center, a intermediate core portion 2 provided around an outer periphery of the central core portion 1, and a ring core portion 3 provided around an outer periphery of the intermediate core portion 2.

The above cladding 5 is provided a substantially constant refractive index.

In addition, the refractive indices of the central core portion 1 and the ring core portion 3 are higher than that of the cladding 5, while the refractive index of the intermediate core portion 2 is lower than that of the cladding 5.

In this example, the intermediate core portion 2 is provided with a refractive index lower than the central core portion 1, and the ring core portion 3 is provided with a refractive index that is higher than the intermediate core portion 2 and lower than the above central core portion 1. The refractive index of the cladding 5 is lower than the ring core portion 3 and higher than the above intermediate core portion 2.

In addition, $\Delta_1$, $\Delta_2$ and $\Delta_3$ are the relative refractive index differences of the central core portion 1, the intermediate core portion 2 and the ring core portion 3, respectively, based on the refractive index of the cladding 5 (zero). In addition, a, b and c are the radii of the central core portion 1, the intermediate core portion 2 and the ring core portion 3, respectively.

A refractive index distribution like that described below is referred to as a segment core refractive index distribution pattern.

The above central core portion 1 and the ring core portion 3 are composed of, for example, $GeO_2$-doped $SiO_2$, and refractive index is adjusted by the amount of $GeO_2$ doped. The intermediate core portion 2 is composed of, for example, F-doped $SiO_2$, while the cladding 5 is composed of pure $SiO_2$ or $SiO_2$ which is containing at least one dopant selected from F, $Cl_2$, or Ge.

In addition, 2a is the outer diameter of the central core portion 1 (a indicates ½ the outer diameter), 2b is the inner diameter of the ring core portion 3 (b indicates ½ the inner diameter), w is the width of the ring core portion 3, $\Delta_2$ is the relative refractive index difference between the cladding 5 and the intermediate core portion 2, $\Delta_3$ is the relative refractive index difference between the cladding 5 and the ring core portion 3, and $\Delta_1$ is the relative refractive index difference between the cladding 5 and the central core portion 1.

The second condition is that, in the refractive index distribution pattern shown in FIG. 1, $2.5 \leq b/a \leq 5.0$, $0.3 \leq w/a \leq 1.7$, $\Delta_2$ is −0.2 to −0.5%, $\Delta_3$ is 0.1 to 1.3%, and $\Delta_1$ is 1.5% or less, and preferably 1.3% or less. These are the ranges of experimentally determined values.

Preferably, $2.7 \leq b/a \leq 3.5$, $0.3 \leq w/a \leq 1.5$, $\Delta_2$ is −0.3 to −0.45%, $\Delta_3$ is 0.2 to 1% and $\Delta_1$ is 0.8 to 1.5%.

More preferably, $2.8 \leq b/a \leq 3.1$, $0.5 \leq w/a \leq 1$, $\Delta_2$ is −0.38 to −0.42%, $\Delta_3$ is 0.4 to 1%, and $\Delta_1$ is 1 to 1.2%.

If b/a is less than 2.5, chromatic dispersion cannot be adequately decreased, and if b/a is greater than 5.0, since optical characteristics approach the characteristics of a matched cladding (single-peak) refractive index distribution pattern, Aeff cannot be enlarged.

If w/a is less than 0.3, effects produced by the ring core portion 3 diminish, and Aeff cannot be enlarged. If w/a is greater than 1.7, the cutoff wavelength becomes longer thereby preventing single-mode transmission.

If $\Delta_2$ is greater than −0.2%, dispersion slope cannot be sufficiently reduced, and if it is less than −0.5%, transmission loss becomes poor and FOM decreases.

If $\Delta_3$ is less than 0.1%, effects produced by the ring core portion 3 are eliminated and Aeff cannot be enlarged. In addition, if it is greater than 1.3%, the cutoff wavelength becomes longer preventing single-mode transmission.

If $\Delta_1$ is greater than 1.5%, it is difficult to make Aeff greater than or equal to 20 $\mu m^2$.

Furthermore, the preferable values of Δ2, Δ3 and Δ1 vary a according to the values of b/a and w/a, and even if they are within the range of the above-mentioned experimentally determined values of Δ2, Δ3 and Δ1, there is no assurance that an optical fiber having the characteristics of the dispersion-compensating optical fiber of a first embodiment of the present invention will be obtained.

From this viewpoint, it is difficult to define the invention only by the values of structural parameters of a dispersion-compensating optical fiber in the first embodiment of the present invention, and was therefore defined according to characteristic values.

It goes without saying, however, that such characteristic values cannot be obtained with dispersion-compensating optical fibers known in the prior art.

The dispersion-compensating optical fiber of a first embodiment of the present invention can be produced by a combination of ordinary VAD and OVD, MCVD and so forth.

In the case of a segment core refractive index distribution pattern, the electric field strength distribution of optical power of transmitted light is drawn out in the form of a long tail on the side of the cladding 5 due to the presence of the ring core portion 3, and during production of the optical fiber base material, it is preferable to adopt a method in which a considerable portion of the suit that forms the cladding is synthesized all at once simultaneous to the suit that forms the central core.

Continuing, the following provides an explanation of a second embodiment.

Second Embodiment

In a second embodiment of the present invention, the prescribed range of wavelength width is selected according to the application from 1.53–1.63 μm for the used wavelength band, examples of which include 1.53–1.57 μm, 1.57–1.63 μm or the entire wavelength band of 1.53–1.63 μm and so forth.

Aeff is represented with the above expression.

The larger Aeff, the lower the non-linearity, thereby making this preferable. In this second embodiment of the present invention, Aeff of 30 μm$^2$ or more, and preferably 35 μm$^2$ or more, is obtained at the above used wavelength band. Although there are no particular restrictions on the upper limit of Aeff, that within a range of 40 μm$^2$ or less can be produced practically. If Aeff is less than 30 μm$^2$, suppressedly effects on non-linearity effects diminish, thereby making this disadvantageous.

In the second embodiment of the present invention, bending loss refers to the value of a bending radius of 20 mm as previously mentioned. It is preferable that bending loss be as low as possible. In the second embodiment of the present invention, bending loss of 40 dB/m or less, preferably 30 dB/m or less, and substantially within a range of 0.1–10 dB/m is obtained at the above used wavelength band. If bending loss exceeds 40 dB/m, loss increases due to the slightest bending applied when laying the optical fiber, thereby making this disadvantageous.

Chromatic dispersion at the above used wavelength band of the dispersion-compensating optical fiber of the second embodiment of the present invention is within the range of –40 to –10 ps/nm/km, and preferably –18 to –25 ps/nm/km. If chromatic dispersion is greater than –10 ps/nm/km and approaches zero, it becomes difficult to compensate the chromatic dispersion of a single-mode optical fiber for transmission. In the case of that in which chromatic dispersion is less than –40 ps/nm/km, Aeff ends up becoming small, substantially making production difficult.

In addition, when connected with a single-mode optical fiber for transmission provided with positive chromatic dispersion and positive dispersion slope at a prescribed used length to compose a transmission path, the dispersion-compensating optical fiber of the second embodiment of the present invention is designed to be able to compensate the chromatic dispersion of the above single-mode optical fiber for transmission so that the absolute value of chromatic dispersion of the entire transmission path is 4.0 ps/nm/km or less, and preferably 2.0 ps/nm/km or less, while simultaneously being able to compensate dispersion slope of the above single-mode optical fiber for transmission so that the absolute value of dispersion slope of the entire transmission path is 0.03 ps/nm$^2$/km or less, and preferably 0.01 ps/nm$^2$/km.

Although a typical example of single-mode optical fiber for transmission that is the target of compensation is a 1.3 μm single-mode optical fiber, there are no particular restrictions on the single-mode optical fiber for transmission used provided it is provided with zero chromatic dispersion at wavelengths shorter than, for example, 1.53 μm, the lower limit of the used wavelength band of the second embodiment of the present invention.

The used length of a dispersion-compensating fiber is set according to the characteristics and so forth of the single-mode optical fiber for transmission to be compensated as previously mentioned. In the second embodiment of the present invention, since the dispersion-compensating optical fiber itself is provided with low loss and low non-linear characteristics that enable it to be used as a transmission path, there is no risk of deterioration of transmission characteristics over the entire transmission path even if the used length is comparatively long. Thus, although there are no particular restrictions, the used length of the dispersion-compensating optical fiber is 1.0 to 2.5 times the single-mode optical fiber for transmission.

In addition, since the optimum dispersion slope varies according to the dispersion slope and used length of the single-mode optical fiber for transmission to be compensated, although there are no particular restrictions, it is preferably, for example, about –0.05 to –0.12 ps/nm$^2$/km.

In addition, since the dispersion-compensating optical fiber of the second embodiment of the present invention compensates single-mode optical fibers, it is preferable that the cutoff wavelength have a value that guarantees single-mode propagation at the above used length.

Although the value measured according to the 2m-method recommended in CCITT-G.652 is normally used for the cutoff wavelength, single-mode propagation can still be performed even if the cutoff wavelength according to the 2m-method is longer than the used wavelength in the state of use over long distances. Thus, cutoff wavelength adopts a value that substantially guarantees single-mode propagation in the actual state of use in consideration of the used length.

In the dispersion-compensating optical fiber of the second embodiment of the present invention, being provided with the refractive index distribution shown in FIG. 1 is a condition for obtaining these characteristics.

In this refractive index distribution, for example, the central core portion 1 and the ring core portion 3 are formed from germanium-doped quartz glass, the intermediate core portion 2 is formed from fluorine-doped quartz glass, and the cladding 5 is formed from pure quartz glass or quartz glass which is containing at least one dopant selected from fluorine, chlorine or germanium.

Furthermore, the cladding 5 preferably has a refractive index that is equal to or less than the value of the refractive index of pure quartz glass. The reason for this is because the stress remaining in the central core portion 1 and so forth after drawing can be reduced by decreasing the difference in softening temperature between core 4 and the cladding 5, thereby allowing the obtaining of an optical fiber with low loss.

In this refractive index distribution, when radii and relative refractive index differences based on the cladding 5 of the central core portion 1, the intermediate core portion 2 and the ring core portion 3 are expressed as $(a,\Delta_1)$, $(b,\Delta_2)$ and $(c,\Delta_3)$, respectively, it is preferable that $2.0 \leq b/a \leq 3.0$, $2.5 \leq c/a \leq 4.0$, $\Delta_1$ is 0.6 to 0.9%, $\Delta_2$ is $-0.30$ to $-0.50\%$, and $\Delta_3$ 0.4 to 0.9%.

If b/a is less than 2.0, The effect of the intermediate core portion 2 diminishes and Aeff decreases, while if b/a exceeds 3.0, bending loss increases, thereby preventing the optical fiber from being used. If c/a is less than 2.5, the effect of the ring core portion 3 diminishes and Aeff decreases, while if c/a exceeds 4.0, bending loss decreases, thereby preventing the optical fiber from being used.

In addition, if $\Delta_1$ is less than 0.6%, bending loss increases, while if it exceeds 0.9%, Aeff decreases. In addition, if $\Delta_2$ is greater than $-0.30\%$ (and approaches the refractive index of the cladding 5), Aeff decreases, while if it is less than $-0.50\%$, bending loss increases thereby preventing the optical fiber from being used. In addition, if $\Delta_3$ is less than 0.4%, the effect of the ring core portion 3 diminishes and Aeff decreases, while if it exceeds 0.9%, bending loss increases, thereby preventing the optical fiber from being used.

Even if the dispersion-compensating optical fiber of the second embodiment of the present invention has the refractive index distribution shown in FIG. 1 and satisfies the above range of values for each structural parameter, there is no guarantee that a dispersion-compensating optical fiber will be obtained that is provided with the above characteristics. Namely, only by selecting suitable values by trial and error so as to be able to realize the above characteristics from the five ranges of values for b/a, c/a, $\Delta_1$, $\Delta_2$ and $\Delta_3$ is it only possible to obtain a dispersion-compensating optical fiber of the second embodiment of the present invention.

Thus, since it is difficult to define the present invention only by the ranges of values pertaining to structural parameters of a dispersion-compensating optical fiber in the dispersion-compensating optical fiber of the second embodiment of the present invention, it was therefore defined according to characteristic values. Furthermore, it goes without saying, however, that such characteristic values cannot be obtained with dispersion-compensating optical fibers known in the prior art.

The dispersion-compensating optical fiber of a second embodiment of the present invention can be produced by a combination of ordinary VAD and OVD, MCVD, PCVD and so forth.

The following provides an explanation of a third embodiment of the present invention.

Third Embodiment

The dispersion-compensating optical fiber of a third embodiment of the present invention is provided with a refractive index distribution pattern similar to that shown in FIG. 1.

In the dispersion-compensating optical fiber of the third embodiment of the present invention, a shown in FIG. 1 is set at 2–3 μm. If a is less than 2 μm, bending loss increases, while if a exceeds 3 μm. Aeff decreases and cutoff wavelength becomes longer, thereby preventing the desired characteristics from being obtained.

In addition, when radii (½ outer diameters) and relative refractive index differences based on the cladding 5 of the central core portion 1, the intermediate core portion 2 and the ring core portion 3 are expressed as $(a,\Delta_1)$, $(b,\Delta_2)$ and $(c,\Delta_3)$, respectively, $\Delta_1$ is preferably 0.9–1.5%. If less than 0.9%, there are cases in which the desired chromatic dispersion and dispersion slope are not obtained. If greater than 1.5%, the amount of dopant doped to the central core portion 1 increases resulting in increased transmission loss. In addition, there is increased susceptibility to the occurrence of non-linear effects due to a decrease in Aeff.

$\Delta_2$ is $-0.30$ to $-0.45\%$. If less than $-0.45\%$, transmission loss deteriorates easily, and if greater than $-0.30\%$, dispersion slope compensation rate deteriorates.

$\Delta_3$ is 0.2–1.2%. If less than 0.2%, Aeff decreases resulting in increased susceptibility to the occurrence of non-linear effects, while if greater than 1.2%, cutoff wavelength becomes longer preventing the obtaining of the desired characteristics.

Moreover, b/a is 2.0–3.5. If less than 2.0, dispersion slope compensation rate deteriorates, while if greater than 3.5, bending loss deteriorates.

In addition, c/a is 3.0–5.0. If less than 3.0, Aeff decreases resulting in increased susceptibility to the occurrence of non-linear effects, while if greater than 5.0, cutoff wavelength becomes longer preventing the obtaining of the desired characteristics.

Furthermore, although there are no particular restrictions on the outer diameter of the cladding 5 (outer diameter of the dispersion-compensating optical fiber), it is normally about 125 μm.

In the third embodiment of the present invention, even if $\Delta_1$ has a comparatively small range in this manner, the preferable characteristics indicated below can be realized by suitably combining a plurality of other structural parameters.

Furthermore, even if the ranges of all of these values are satisfied, there is no guarantee that a dispersion-compensating optical fiber provided with the following characteristics can be obtained. Namely, a combination of a plurality of suitable structural parameters allowing the obtaining of the following characteristics can only be obtained by trial and error.

Thus, since it is difficult to define the invention only by refractive index distribution pattern and the ranges of values of structural parameters in the dispersion-compensating optical fiber of the third embodiment of the present invention, it is defined by the following characteristic values in addition to these constructions.

In this manner, a dispersion-compensating optical fiber having a small value for $\Delta_1$, superior chromatic dispersion and dispersion slope compensating effects and enlarged Aeff for suppressing non-linear effects was unable to be obtained in the prior art.

The used wavelength band in the third embodiment of the present invention refers to a wavelength band selected from 1.53–1.63 μm. The range of wavelength width of the used wavelength band can be suitably selected as necessary, and may substantially be a single wavelength. Furthermore, a comparatively wide wavelength band is selected for wavelength division multiplexing transmission and so forth, examples of wavelength bands that can be selected including 1.53–1.57 μm (so-called C-band) and 1.55–1.63 μm (so-called L-band). The dispersion-compensating optical fiber of the third embodiment of the present invention has an Aeff of 20 $\mu m^2$ or more, and preferably 26 $\mu m^2$ or more, at the selected used wavelength. Since $\Delta_1$ is small, this kind of large Aeff can be realized. Although there are no particular restrictions on the upper limit of Aeff, an optical fiber having an Aeff of 30 $\mu m^2$ or less can be substantially produced. If Aeff is less than 20 $\mu m$, non-linear effects are unable to be suppressed thereby making this disadvantageous.

Furthermore, Aeff is defined by the previously mentioned expression.

In addition, although bending loss is preferably as small as possible, the dispersion-compensating optical fiber of the third embodiment of the present invention has bending loss of 40 dB/m or less, and preferably 20 dB/m or less, at the selected used wavelength mentioned above. If bending loss is 40 dB/m or less, there is little deterioration of transmission loss caused by even slight stress applied when laying the optical fiber and so forth, thereby allowing the obtaining of stable characteristics.

Furthermore, bending loss is the value obtained under conditions of the bending radius (2R) being 20 mm as previously mentioned.

Moreover, the dispersion-compensating optical fiber of the third embodiment of the present invention has chromatic dispersion of −65 to −45 ps/nm/km at the selected used wavelength mentioned above.

If within this range, it is possible to compensate chromatic dispersion of single-mode optical fibers provided with comparatively large positive chromatic dispersion in this used wavelength band and a zero dispersion wavelength that is shorter than above used wavelength band typically represented by 1.3 $\mu m$ single-mode optical fibers by a dispersion-compensating optical fiber of a comparatively short length.

In addition, It is necessary that the dispersion-compensating optical fiber of the third embodiment of the present invention be a single-mode optical fiber. Namely, it must be provided with a cutoff wavelength that is able to maintain single-mode propagation in the state of actual use. Although the value measured by the so-called 2m-method is normally used for the cutoff wavelength, in the case of actual use over long distances, single-mode propagation can be performed even if the cutoff wavelength as determined by the 2m-method is longer than the shortest wavelength of the used wavelength band.

Thus, a suitable upper limit is set for the cutoff wavelength according to the used wavelength band and used length, and a dispersion-compensating optical fiber is designed so as to realize a value that does not exceed this upper limit.

In addition, the dispersion slope of the dispersion-compensating optical fiber of the third embodiment of the present invention is such that the compensation rate of dispersion slope when using a dispersion-compensating optical fiber of a length that is able to compensate the chromatic dispersion of a single-mode optical fiber compensated by this dispersion-compensating optical fiber to zero is 80–120%. If outside of this range, compensation of dispersion slope becomes inadequate, thereby possibility causing difficulties during wavelength division multiplexing transmission and so forth.

The compensation rate of dispersion slope is determined in the manner described below.

The absolute values of chromatic dispersion and dispersion slope per unit length of a single-mode optical fiber in the used wavelength band are respectively taken to be d1 (ps/nm/km) and s1 (ps/nm$^2$/km), while the absolute values of chromatic dispersion and dispersion slope per unit length of a dispersion-compensating optical fiber are respectively taken to be d2 (ps/nm/km) and s2 (ps/nm$^2$/km).

The chromatic dispersion and dispersion slope of the above single-mode optical fiber are normally positive values. The chromatic dispersion and dispersion slope of the dispersion-compensating optical fiber of the third embodiment of the present invention are normally negative values.

To begin with, the length of a dispersion-compensating optical fiber able to compensate the dispersion wavelength of a single-mode optical fiber of a unit length to zero is expressed as d1/d2. The dispersion slope of a dispersion-compensating optical fiber at this length is expressed as d1/d2×s2. The compensation rate of dispersion slope of a single-mode optical fiber per unit length by a dispersion-compensating optical fiber of this length is expressed as (d1/d2×s2)/s1×100.

In this manner, since the compensation rate of dispersion slope varies according to the chromatic dispersion and dispersion slope of the single-mode optical fiber to be compensated in the used wavelength band, and the chromatic dispersion and dispersion slope of the dispersion-compensating optical fiber itself, it is necessary to design the dispersion-compensating optical fiber to match the target used wavelength band and single-mode optical fiber.

In the dispersion-compensating optical fiber of the third embodiment of the present invention, the dispersion slope of a single-mode optical fiber provided with a zero dispersion wavelength shorter than the above used wavelength band, as is represented by 1.3 $\mu m$ single-mode optical fibers, can be adequately compensated within the range of the compensation rate of this dispersion slope by a suitable combination of structural parameters selected from the above range of values. For example, that over a range of −0.13 to −0.27 ps/nm$^2$/km can be arbitrarily set as the negative dispersion slope of a dispersion-compensating optical fiber.

In addition, in the refractive index distribution pattern shown in FIG. 1, it is preferable that dopant be doped to each layer. In particular, although there are many cases in which the cladding 5 is composed of pure quartz glass as previously described, in order to obtain a dispersion-compensating optical fiber having low loss by reducing the difference in viscosity with core 4 during drawing to increase the drawing speed, it is effective to add dopant to the cladding 5.

Namely, the central core portion 1 and the ring core portion 3 are preferably formed from germanium-doped quartz glass, the intermediate core portion 2 is preferably formed from fluorine-doped quartz glass, and the cladding 5 is formed from quartz glass which is containing at least one dopant selected from fluorine, chlorine, and germanium, preferably quartz glass doped with a small amount of fluorine.

Furthermore, when doping the cladding 5 with fluorine, if the amount doped is adjusted so that, for example, the relative refractive index difference based on pure quartz is about −0.1 to −0.4%, adequate effects can be obtained.

This dispersion-compensating optical fiber can be produced using known methods such as VAD, MCVD or PCVD and so forth.

In this manner, since $\Delta_1$ of the dispersion-compensating optical fiber of the third embodiment of the present invention is small and the difference in viscosity between core 4 and the cladding 5 during drawing is small, the mechanical strength of this dispersion-compensating optical fiber does not tend to lower even if the drawing speed is increased beyond that of dispersion-compensating optical fibers of the prior art. Consequently, a dispersion-compensating optical fiber having low loss can be obtained by drawing at higher speeds than in the prior art. In addition, the occurrence of non-linear effects can be suppressed as a result of enlarging Aeff.

In addition, the dispersion-compensating optical fiber of the third embodiment of the present invention allows the construction of a hybrid transmission line suitable for wavelength division multiplexing transmission, long-distance transmission and so forth by combining with a single-mode optical fiber.

The length and so forth of the dispersion-compensating optical fiber and single-mode optical fiber used in a hybrid transmission line are set to suitable values according to the characteristics and design conditions of each fiber.

Furthermore, normally a single-mode optical fiber is arranged in a former stage, and a dispersion-compensating optical fiber is arranged in a latter stage so as to compensate chromatic dispersion and dispersion slope that have accumulated due to propagation of this single-mode optical fiber.

Although the combined single-mode optical fiber may be a 1.3 μm single-mode optical fiber as was previously mentioned, there are no particular restrictions on this single-mode optical fiber provided it has a zero dispersion wavelength that is shorter than the used wavelength band, and is provided with positive chromatic dispersion and positive dispersion slope in the used wavelength band.

For example, the use of a single-mode optical fiber like that indicated below is preferable.

Figure 2:
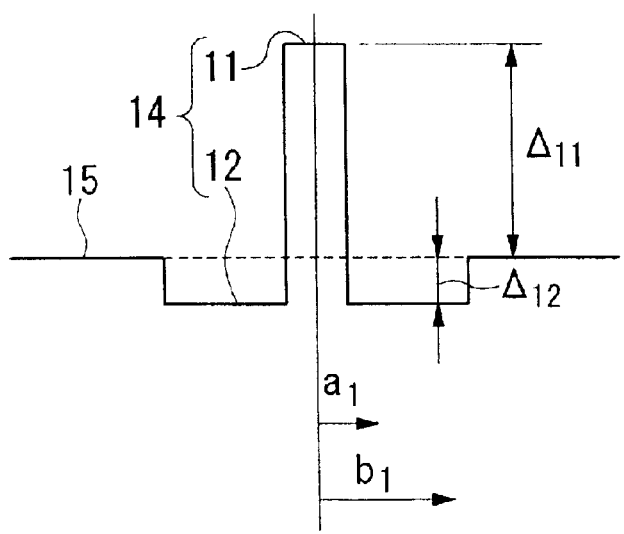
FIG. 2 is a drawing showing an example of a so-called W-shaped refractive index distribution pattern.

This single-mode optical fiber has the so-called W-shaped refractive index distribution pattern shown in FIG. 2. This refractive index distribution pattern is provided with a core 14 and a cladding 15 provided around an outer periphery of the core 14. The core 14 is provided with a central core portion 11, which is provided with a refractive index higher than the above cladding 15, and intermediate core portion 12, which is provided around an outer periphery of core portion 11 and is provided with a refractive index lower than this cladding 15. In the drawing, $a_1$ is the radius of the central core portion 11, $b_1$ is the radius of intermediate core portion 12 (radius of core 14), and $\Delta_{11}$ and $\Delta_{12}$ are the relative refractive index difference with the central core portion 11 and the relative refractive index difference with intermediate core portion 12, respectively, when based on the refractive index of cladding 15 (zero). Namely, $\Delta_{11}$ is a positive value and $\Delta_{12}$ is a negative value.

This single-mode optical fiber has Aeff of 120 $\mu m^2$ or more in the used wavelength band, and has a cutoff wavelength that substantially allows single-mode propagation.

If Aeff is 120 $\mu m^2$ or more, since there is less susceptibility to the occurrence of non-linear effects, the resulting single-mode optical fiber has low loss, and characteristics are obtained that are particularly suitable for long-distance, wavelength division multiplexing transmission and so forth.

In addition, the cutoff wavelength is a condition for being a single-mode optical fiber.

In this single-mode optical fiber as well, a single-mode optical fiber can be obtained provided with the above conditions for Aeff and cutoff wavelength by selecting and combining suitable values for $a_1$, $b_1$, $\Delta_{11}$ and $\Delta_{12}$.

$b_1/a_1$ is selected from a range of, for example, 3.0–5.0. If less than 3.0, since the optical electromagnetic field is able to easily extend beyond intermediate core portion 12 and reach cladding 15, bending loss tends to increase. In addition, if greater than 5.0, the effect of providing intermediate core portion 12 diminishes and trapping of the optical electromagnetic filed in the core becomes excessively strong, which tends to decrease the effect of enlarging Aeff.

In addition, the cutoff wavelength can be shifted towards a longer wavelength by increasing the value of $a_1$. As was mentioned above, since cutoff wavelength is set according to the used length and wavelength band of the optical fiber, it is generally not possible to indicate the range of values of $a_1$. However, a, is normally selected from a range of 5–20 μm.

The outer diameter of cladding 15 is normally about 125 μm.

In addition, $\Delta_{11}$ is 0.3% or less, and preferably 0.26% or less, while $\Delta_{12}$ is preferably −0.05 to −0.15%.

If $\Delta_{11}$ exceeds 0.3%, it becomes difficult to enlarge Aeff. In addition, if $\Delta_{12}$ is greater than −0.05% (when the absolute value of $\Delta_{12}$ becomes smaller), bending loss increases. If $\Delta_{12}$ is smaller than −0.15% (when the absolute value of $\Delta_{12}$ becomes larger), Aeff tends to decrease.

Moreover, chromatic dispersion is preferably +19 to +22 ps/nm/km, dispersion slope preferably +0.065 $ps/nm^2/km$ or less, and bending loss preferably 10 dB/m or less.

Furthermore, the central core portion 11 is preferably composed of germanium-doped quartz glass, intermediate core portion 12 is preferably composed of fluorine-doped quartz glass, and cladding 15 is composed of pure quartz glass or quartz glass which is containing at least one dopant selected from fluorine, chlorine, and germanium, preferably fluorine-doped quartz glass.

This single-mode optical fiber can be produced by common production methods in the same manner as the above-mentioned dispersion-compensating optical fiber.

Combining this single-mode optical fiber with the dispersion-compensating optical fiber of the third embodiment of the present invention makes it possible to construct a hybrid transmission line having low non-linearity, low loss, little chromatic dispersion and low dispersion slope.

The following provides an explanation of a fourth embodiment of the present invention.

Fourth Embodiment

Figure 3:
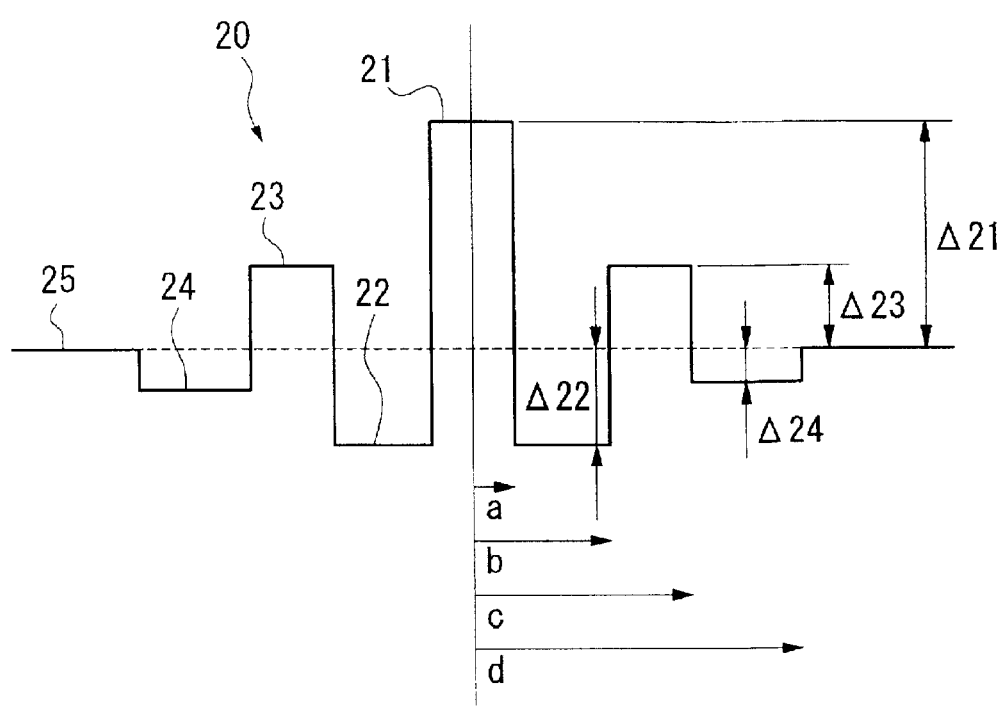
FIG. 3 is a drawing showing an example of the refractive index distribution pattern of a dispersion-compensating optical fiber of a fourth embodiment of the present invention.

The dispersion-compensating optical fiber as claimed in a fourth embodiment of the present invention is provided with a refractive index distribution pattern like that shown in FIG. 3.

This refractive index distribution pattern is provided with a core 20 and a cladding 25 provided around an outer periphery of the core 20. Said core 20 is provided with a central core portion 21 having a higher refractive index than the above cladding 25, a intermediate core portion 22 provided around an outer periphery of said central core portion 21 and having a refractive index lower than the above cladding 25, a ring core portion 23 provided around an outer periphery of said intermediate portion 22 and having a refractive index higher than the above cladding 25, and a side ring core portion 24 provided around an outer periphery of said ring core portion 23 and having a refractive index lower than the above cladding 25.

In addition, in this example, the refractive index of the ring core portion 23 is lower than that of the central core portion 21, and the refractive index of the side ring core portion 24 is higher than that of the intermediate core portion 22.

Furthermore, in the drawing, a, b, c and d represent the radii (½ of outer diameters) of the central core portion 21, the intermediate core portion 22, the ring core portion 23 and the side ring core portion 24, respectively, and $\Delta_{21}$, $\Delta_{22}$, $\Delta_{23}$ and $\Delta_{24}$ represent the relative refractive index differences based on the cladding 25 of the central core portion 21, the intermediate core portion 22, the ring core portion 23 and the side ring core portion 24, respectively.

In this example, the central core portion 21 and the ring core portion 23 are formed from quartz glass containing a dopant that provides the effect of increasing the refractive index, while the intermediate core portion 22 and the side ring core portion 24 are formed from quartz glass containing a dopant that provides the effect of lowering the refractive index. Germanium (Ge) is a typical example of a dopant that has the effect of increasing refractive index, and germanium is doped in the form of $GeO_2$. In addition, fluorine (F) is a typical example of a dopant that has the effect of lowering refractive index.

Furthermore, at least one type or two or more types of dopants selected from the group consisting of germanium, aluminum (Al), phosphorous (P) and fluorine are used for the dopant doped to the central core portion 21, the intermediate core portion 22, the ring core portion 23, the side ring core portion 24 and the cladding 25, and the type(s) of dopant and amount doped are suitably selected according to the desired refractive index.

In this dispersion-compensating optical fiber, the cladding 25 is formed from quartz glass containing dopant. This dopant is provided with the effect of lowering refractive index, and a typical example of such a dopant is fluorine as mentioned above. As a result, the softening temperature of the cladding 25 becomes lower than pure quartz glass. In other words, the base refractive index of $\Delta_{21}$, $\Delta_{22}$, $\Delta_{23}$ and $\Delta_{24}$ (zero) is lower than the refractive index of pure quartz glass.

Thus, the amount of dopant doped is less in the central core portion 21 and the ring core portion 23 provided with higher refractive indices than the cladding 25. The decreases in softening temperature and hardening temperature due to addition of dopant can therefore be reduced in the central core portion 21 and the ring core portion 23 more than in the case of being based on the cladding 25 composed of pure quartz glass. In addition, the difference in viscosity of each layer in the proximity of 1900° C. can also be reduced.

Although the differences in softening temperature and hardening temperature between the cladding 25, comprised of pure quartz glass, and the central core portion 21, containing a large amount of dopant, in particular presented a problem in the prior art, in the fourth embodiment of the present invention, since the softening and hardening temperatures of the cladding 25 are lowered while the softening and hardening temperatures of the central core portion 21 are raised, the difference between their softening and hardening temperatures is smaller, and the viscosity difference at the drawing temperature is also smaller. As a result, the amount of stress remaining in the portion to the inside of the cladding 25, and particularly in the central core portion 21, after drawing can be reduced even if drawn at the drawing temperature guaranteed by the mechanical strength of the dispersion-compensating fiber, thereby making it possible to reduce deterioration of transmission loss caused by this.

The relative refractive index difference of the central core portion 21 ($\Delta_{21}$) based on the cladding 25 (zero) is set at 0.90–1.30%, and preferably 0.90–1.00%. If it is less than 0.90% and approaches zero, the amount of dopant doped decreases thereby preventing the softening and hardening temperature from being raised sufficiently. If greater than 1.30%, the amount of dopant doped increases, resulting in a possible increase in transmission loss.

The relative refractive index difference of the side ring core portion 24 ($\Delta_{24}$) based on the cladding 25 (zero) is set at −0.50 to 0.00%, and preferably −0.25 to −0.02%. If it is less than −0.50% and the amount of dopant doped increases, the amount of dopant doped of $\Delta_{22}$ increases which may result in deterioration of transmission loss. If it is greater than 0.00%, the amount of dopant doped decreases, thereby preventing the softening and hardening temperature from being lowered sufficiently.

The dispersion-compensating optical fiber of the fourth embodiment of the present invention is obtained by producing a cylindrical fiber base material in which dopant is doped to each layer by a known method such as VAD, MCVD or PCVD, arranging so that the direction of length of this fiber base material is in the vertical direction, and drawing the lower end of this fiber base material by heating.

In general, the outer diameter of the fiber base material is 30–80 mm, and the outer diameter of the dispersion-compensating optical fiber is 80–125 μm. In addition, the heating temperature during drawing of the dispersion-compensating optical fiber of the fourth embodiment of the present invention his 1800–2100° C., and the drawing speed is 100–300 m/min. In addition, the drawing tension at this time is to be 100–200 g. Practical mechanical strength is obtained under these conditions.

The entire portion from the central core portion 21 to the cladding 25 of the dispersion-compensating optical fiber of the fourth embodiment of the present invention is composed of quartz glass containing dopant, and since the softening and hardening temperatures are low, the heating temperature of the fiber base material can be lower than that of the prior art provided with the cladding 25 composed of pure quartz glass.

Furthermore, the refractive index pattern of an actual dispersion-compensating optical fiber is in the shape of a gentle curve, and the boundaries between each component portion are indistinct. Accordingly, as will be described below, it is preferable to produce this optical fiber by first setting the values of $\Delta_{22}$ and other structural parameters, and then make fine adjustments while monitoring optical characteristics during actual production.

In this manner, in the fourth embodiment of the present invention, by forming the cladding 25 from quartz glass containing dopant, the differences in softening temperatures and hardening temperatures between the central core portion 21 and the cladding 25 can be decreased, and the difference in viscosity between the central core portion 21 and the cladding 25 during drawing can be made smaller.

As a result, the amount of stress remaining in core portion 21 and so forth after drawing can be reduced, thereby making it possible to reduce deterioration of transmission loss even if drawn at a temperature at which practical mechanical strength is obtained.

By suitably setting $\Delta_{21}$, $\Delta_{22}$, $\Delta_{23}$, $\Delta_{24}$, b/a, c/a and d/a in the dispersion-compensating optical fiber provided with the refractive index distribution pattern of the fourth embodiment of the present invention, desirable characteristics can be realized for chromatic dispersion, dispersion slope, bending loss and so forth.

This type of refractive index distribution pattern is preferable from the viewpoint of suppressing non-linear effects as a result of being able to enlarge Aeff to 20 μm² or more, preferably 25 $\mu m^2$ or more as previously mentioned. In addition, since bending loss can also be decreased at longer wavelengths, this is also preferable from the viewpoint of using in the L-band (1.57–1.63 $\mu m$).

The used wavelength band of the dispersion-compensating optical fiber of the fourth embodiment of the present invention is selected from the range of 1.45–1.63 $\mu m$. For example, the used wavelength band is suitably selected from the range of 1.45–1.57 $\mu m$, 1.57–1.63 $\mu m$, or combining both and selected from the range of 1.45–1.63 $\mu m$, according to the amplification wavelength band of an Er-doped optical fiber amplifier.

In addition, chromatic dispersion in the used wavelength band of the dispersion-compensating optical fiber of the fourth embodiment of the present invention is set at –70 to –45 ps/nm/km. In the case it is greater than –45 ps/nm/km and approaches zero, the used length becomes longer which is disadvantageous. If chromatic dispersion is less than –70 ps/nm/km, characteristics deteriorate easily resulting in production being difficult.

The object of the dispersion-compensating optical fiber of the fourth embodiment of the present invention is to compensate chromatic dispersion and dispersion slope of a single-mode optical fiber for transmission having positive chromatic dispersion in the above used wavelength band in the manner of a 1.3 $\mu m$ single-mode optical fiber.

Accordingly, single-mode optical fibers for transmission targeted for compensation by the dispersion-compensating optical fiber of the fourth embodiment of the present invention are not only 1.3 $\mu m$ single-mode optical fibers, but also include single-mode optical fibers having a zero dispersion wavelength shorter than the used wavelength band in which chromatic dispersion increases at wavelengths longer than this zero dispersion wavelength. This type of single-mode optical fiber normally has a positive dispersion slope.

It is preferable that the dispersion slope of the dispersion-compensating optical fiber of the fourth embodiment of the present invention be such that a compensation rate of the dispersion slope using a dispersion-compensating optical fiber of a length that reduces the chromatic dispersion of the combined single-mode optical fiber for transmission to zero is 80–120% during compensation of this single-mode optical fiber. If within this range, dispersion slope can be adequately compensated, allowing the obtaining of satisfactory wavelength division multiplexing transmission characteristics.

The above compensation rate of the dispersion slope defined as RDS(DCF)/RDS (single-mode optical fiber)× 100, when the value obtained by dividing the dispersion slope of the single-mode optical fiber by chromatic dispersion of the single-mode optical is taken to be RDS (single-mode optical fiber), and the value obtained by dividing the dispersion slope of the dispersion-compensating optical fiber by chromatic dispersion of the dispersion-compensating optical fiber is taken to be RDS (DCF).

As has been described above, since the compensation rate of dispersion slope varies according to the chromatic dispersion and dispersion slope of the single-mode optical fiber for transmission targeted for compensation in the used wavelength band, and the chromatic dispersion and dispersion slope of the dispersion-compensating optical fiber itself, it is necessary to design a dispersion-compensating optical fiber according to the target used wavelength band and the single-mode optical fiber for transmission.

In addition, bending loss refers to the value under the condition of a bending radius (2R) of 20 mm as previously mentioned in the used wavelength band. In the dispersion-compensating optical fiber of the fourth embodiment of the present invention, the bending loss in the used wavelength band (preferably wavelength 1.63 $\mu m$ band) is preferably 50 dB/m or less. If it exceeds 50 dB/m, there are cases in which transmission characteristics deteriorate due to even the slightest bending applied when laying the optical fiber and so forth.

In the dispersion-compensating optical fiber of a fourth embodiment of the present invention shown in FIG. 3, the value of $\Delta_{21}$ is determined relatively from the relationship with other structural parameters and so forth, and has a wider range than the range of the value of $\Delta_{11}$ of a so-called W-shaped refractive index distribution pattern shown in FIG. 2, and the range of the value of $\Delta_1$ of a segment core refractive index distribution pattern shown in FIG. 1.

Figure 4A:
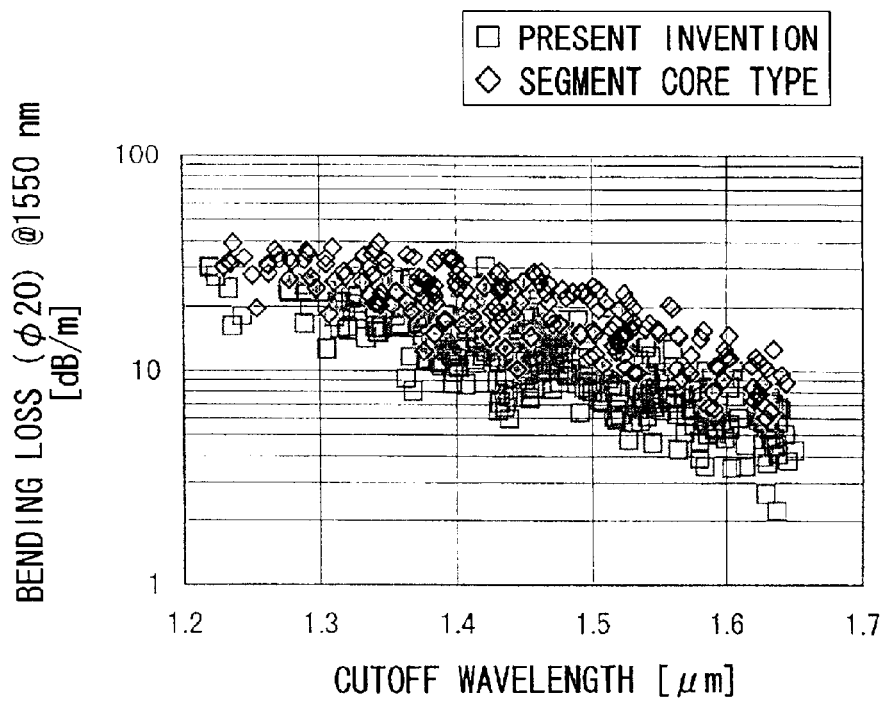
FIGS. 4A and 4B are graphs showing the relationship between bending loss and cutoff wavelength at a wavelength of 1.55 μm (FIG. 4A) or 1.63 μm (FIG. 4B) for the dispersion-compensating optical fiber of a fourth embodiment of the present invention and a dispersion-compensating optical fiber provided with a segment core refractive index distribution pattern of the prior art.
Figure 4B:
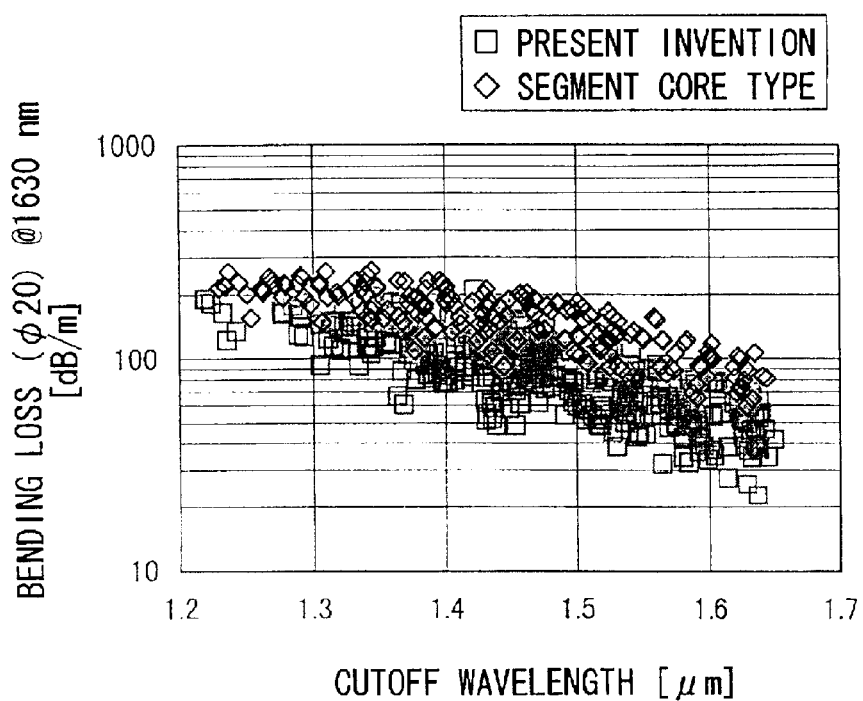

FIGS. 4A and 4B are graphs showing the relationship between bending loss and cutoff wavelength at a wavelength of 1.55 $\mu m$ or 1.63 $\mu m$ when targeting Aeff=25–28 $\mu m^2$ for a dispersion-compensating optical fiber provided with a segment core refractive index distribution pattern of the prior art and the dispersion-compensating optical fiber of the fourth embodiment of the present invention.

Figure 5A:
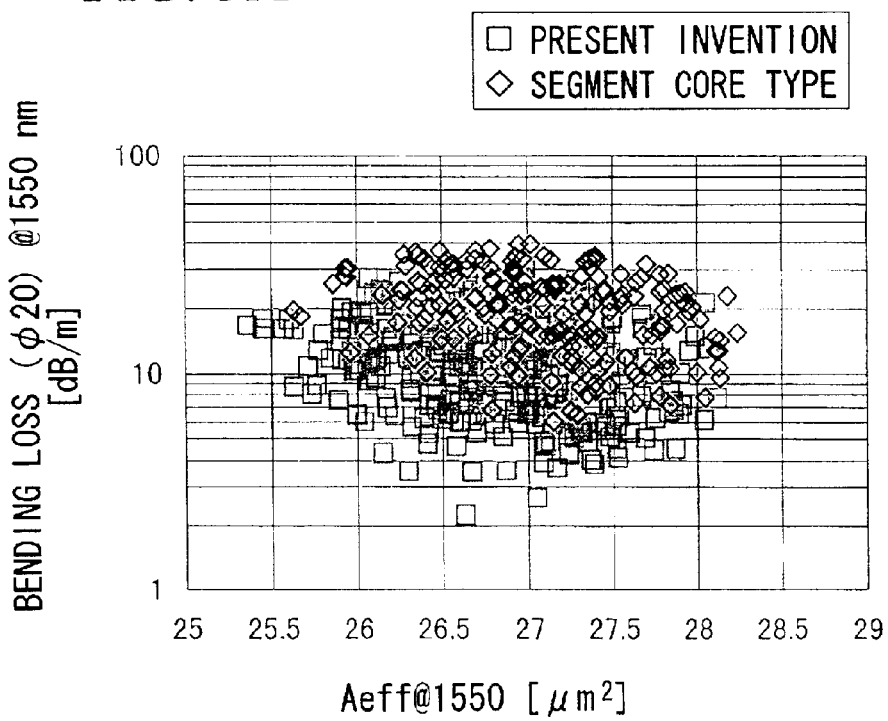
FIGS. 5A and 5B are graphs showing the relationship between bending loss and Aeff at a wavelength of 1.55 μm (FIG. 5A) or 1.63 μm (FIG. 5B) for a dispersion-compensating optical fiber of a fourth embodiment of the present invention and a dispersion-compensating optical fiber provided with a segment core refractive index distribution pattern of the prior art.
Figure 5B:
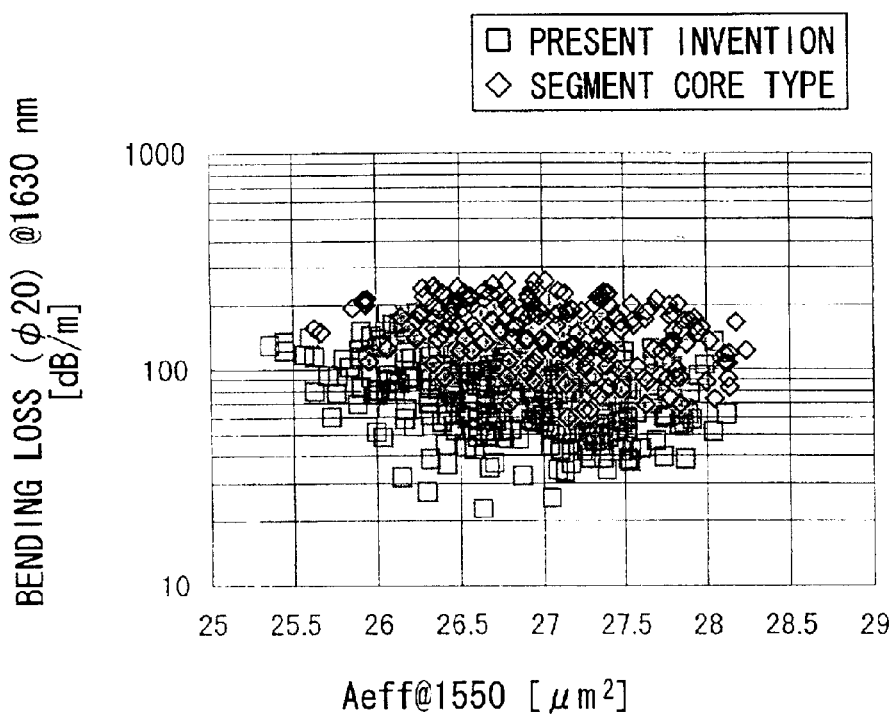

FIGS. 5A and 5B are graphs showing the relationship between bending loss and Aeff for a dispersion-compensating optical fiber provided with a segment core refractive index distribution pattern of the prior art, and the dispersion-compensating optical fiber of the fourth embodiment of the present invention.

According to FIGS. 4A and 4B and FIGS. 5A and 5B, when compared with a dispersion-compensating optical fiber of the prior art, it can be understood that the dispersion-compensating optical fiber of the fourth embodiment of the present invention is able to lower bending loss either in the case of having the same cutoff wavelength or the case of having the same Aeff.

Furthermore, the points shown in these graphs assume a single-mode optical fiber for transmission in which the RDS value (single-mode optical fiber), determined by dividing the chromatic dispersion slope of the single-mode optical fiber for transmission by its chromatic dispersion, is about 0.003.

In addition, it is also assumed that wavelength compensation is performed using a ratio of 3:1 for the ratio of the length of the single-mode optical fiber for transmission to the length of the dispersion-compensating optical fiber, and that the single-mode optical fiber for transmission is able to adequately withstand lateral pressure.

If the side ring core portion of this dispersion-compensating optical fiber for transmission is too large, the cutoff wavelength becomes longer and the dispersion-compensating optical fiber for transmission becomes susceptible to lateral pressure. In order to prevent this, $\Delta_{24}$ is –0.50 to 0.00%, and preferably –0.25 to –0.02%, while the normalized frequency (V4) is –15.0 to 0.0, and preferably –10.0 to –1.0. Here, the normalized frequency refers to the frequency resulting from normalizing the optical frequency using the structural parameters of an optical waveguide.

In addition, although it is effective to enlarge Aeff in order to suppress non-linear effects, the value of $\Delta_{21}$ must be decreased in order to accomplish this. However, if the value of $\Delta_{21}$ is too small, the dispersion-compensating optical fiber for transmission becomes susceptible to lateral pressure. Thus, the value of $\Delta_{21}$ is preferably 0.90–1.00%.

An optical fiber transmission path combining the dispersion-compensating optical fiber of the fourth embodiment of the present invention with an optical fiber in which Aeff is 70 $\mu m^2$ or more at a used wavelength selected from 1.45–1.63 $\mu m$, and has a cutoff wavelength that allows single-mode propagation, has superior effects that suppress increases in transmission loss.

Namely, this is because, in the dispersion-compensating optical fiber of the fourth embodiment of the present invention, non-linear effects can be suppressed in an optical fiber in which dispersion slope approaches zero that is selected in the manner described above.

The following provides an explanation of a fifth embodiment of the present invention.

Fifth Embodiment

The dispersion-compensating optical fiber of a fifth embodiment of the present invention is provided with the refractive index distribution pattern shown in FIG. 1.

This dispersion-compensating optical fiber is provided with core 4 and the cladding 5 provided around an outer periphery of the core 4. This core 4 is provided with a three-layer structure comprised of the central core portion 1 provided in its center, the intermediate core portion 2 provided around an outer periphery of said the central core portion 1, and the ring core portion 3 provided around an outer periphery of said the intermediate core portion 2.

The above the cladding 5 is provided a substantially constant refractive index.

In addition, the refractive indices of the central core portion 1 and the ring core portion 3 are higher than that of the cladding 5, while the refractive index of intermediate core portion is lower than that of the cladding 5.

The central core portion 1 and the ring core portion 3 are composed of, for example, germanium-doped quartz glass, the intermediate core portion 2 is composed of, for example, pure quartz glass or fluorine-doped quartz glass, and the cladding 5 is composed of, for example, pure quartz glass or quartz glass which is containing at least one dopant selected from fluorine, chlorine and germanium.

By using this type of refractive index distribution pattern and suitably setting the ratios of differences in specific refractivity and radius of each layer, a dispersion-compensating optical fiber can be obtained that has little fluctuation in chromatic dispersion at long wavelengths in particular and can be used over a broad wavelength band such as from the S-band to the C-band or from the C-band to the L-band. Aeff can also be simultaneously enlarged to suppress non-linear effects.

This dispersion-compensating optical fiber can be produced by drawing from a fiber base material obtained by a known method such as VAD, MCVD or PCVD. In addition, if substantially provided with the refractive index distribution pattern shown in FIG. 1, there is no need for a refractive index diffraction pattern completely in the shape of steps having a well-defined border between each layer, but rather may be in the form of a pattern that changes gradually.

The used wavelength band of the dispersion-compensating optical fiber of the fifth embodiment of the present invention is selected a continuous range provided with a wavelength width of 0.06 $\mu m$ or more, and preferably 0.10 $\mu m$ or more from a used wavelength of 1.45–1.63 $\mu m$. In the fifth embodiment of the present invention, the preferable characteristics described below can be realized in a broad wavelength band as described above.

In addition, since the larger the absolute value of chromatic dispersion of the dispersion-compensating optical fiber, the greater the compensation of chromatic dispersion at a short used wavelength relative to the length of the single-mode optical fiber for transmission, this is preferable from the viewpoint of cost, transmission loss and so forth.

However, since Aeff becomes smaller the larger the absolute value of chromatic dispersion, this is disadvantageous from the viewpoint of suppressing non-linear effects.

Consequently, it is preferable to set the chromatic dispersion of the dispersion-compensating optical fiber of the fifth embodiment of the present invention to −40 ps/nm/km or less and −65 ps/nm/km or more at a wavelength of 1.55 $\mu m$.

In addition, since the dispersion-compensating optical fiber of the fifth embodiment of the present invention compensates positive chromatic dispersion and positive dispersion slope of a single-mode optical fiber for transmission, it is required to have negative chromatic dispersion slope. Although dependent on the characteristics of the single-mode optical fiber for transmission, it preferably has a negative chromatic dispersion slope within the range of, for example, −0.22 to −0.11 ps/nm$^2$/km in the used wavelength band.

In addition, since the dispersion-compensating optical fiber of the fifth embodiment of the present invention is able to enlarge Aeff to 18 $\mu m^2$ or more, and preferably 20 $\mu m^2$ or more, at a wavelength of 1.55 $\mu m$, this is preferable from the viewpoint of controlling non-linear optical effects. Although there is no particular restriction on the upper limit of Aeff, it should be about 30 $\mu m^2$ from the viewpoint of the balance with other characteristics.

Furthermore, Aeff is defined by the previously mentioned expression.

In addition, bending loss is the value obtained under conditions of a bending radius (2R) of 20 mm at a wavelength of 1.55 $\mu m$, and in the fifth embodiment of the present invention, a dispersion-compensating optical fiber is obtained having bending loss is 50 dB/m or less, and preferably 20 dB/m or less. If bending loss exceeds 50 dB/m, there are cases in which transmission loss deteriorates due to micro-bending applied during manufacturing or laying, etc.

In addition, since the dispersion-compensating optical fiber of the fifth embodiment of the present invention is a single-mode optical fiber, it is required to have a cutoff wavelength that substantially allows single-mode propagation. Although the value according to the 2m-method recommended in CCITT-G. 652 is typically used for the cutoff wavelength, in the actual state of a long fiber, single-mode propagation can be performed even if the value determined by the 2m-method is longer than 1.55 $\mu m$. Thus, it is necessary to design the optical fiber so that a suitable cutoff wavelength is obtained according to the used length and other actual conditions of use.

Figure 6A:
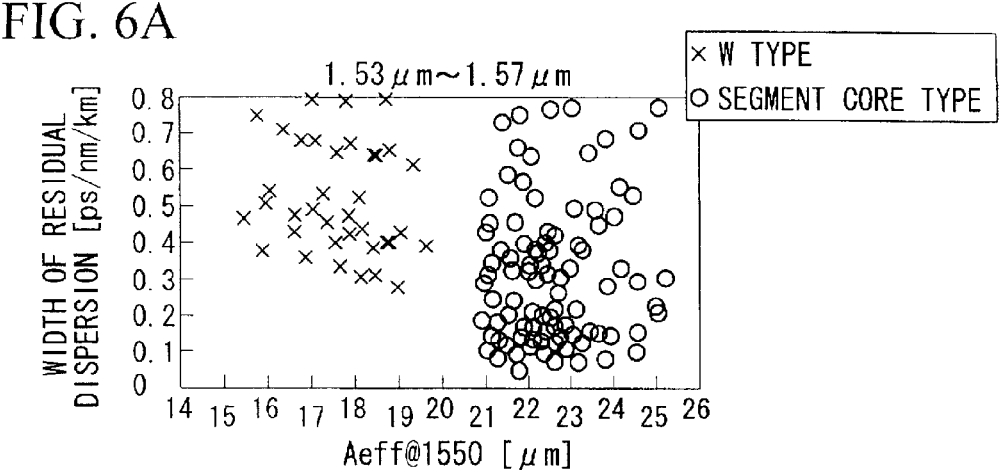
FIGS. 6A through 6C are graphs comparing the dispersion compensation characteristics of a segment core dispersion-compensating optical fiber of a fifth embodiment of the prevent invention and a dispersion-compensating optical fiber provided with a W-shaped refractive index distribution pattern for each wavelength range, with FIG. 6A showing the graph for a wavelength of 1.53–1.57 μm, FIG. 6B for a wavelength of 1.45–1.53 μm, and FIG. 6C for a wavelength of 1.53–1.63 μm.
Figure 6B:
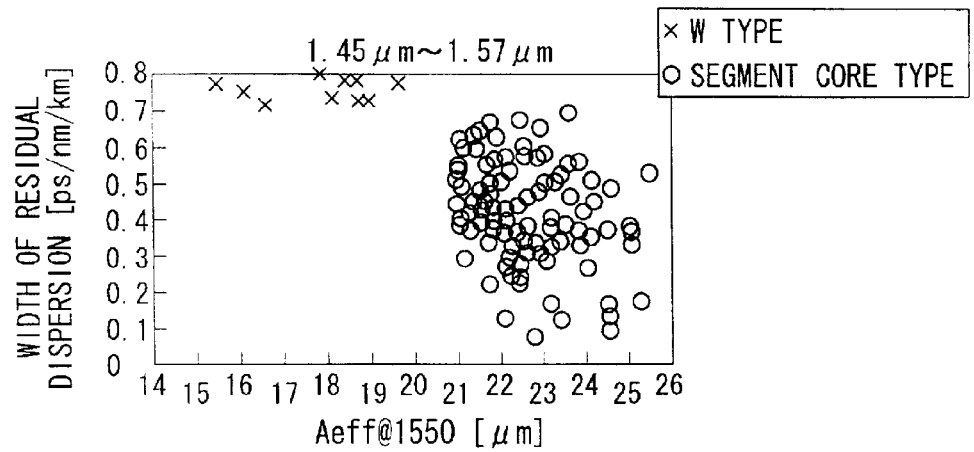
Figure 6C:
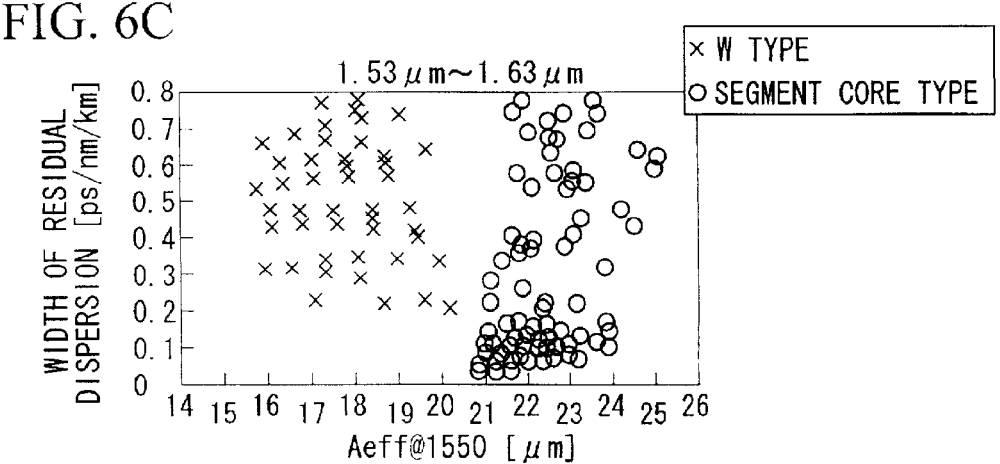

FIGS. 6A through 6C are graphs comparing the dispersion compensation characteristics for each wavelength range between the segment core dispersion-compensating optical fiber of the fifth embodiment of the present invention, and a dispersion-compensating optical fiber provided with a W-shaped refractive index distribution pattern shown in FIG. 2. Furthermore, in the W-shaped refractive index distribution pattern, characteristics as the compensating optical fiber are also obtained by adjustment of structural parameters.

Figure 7:
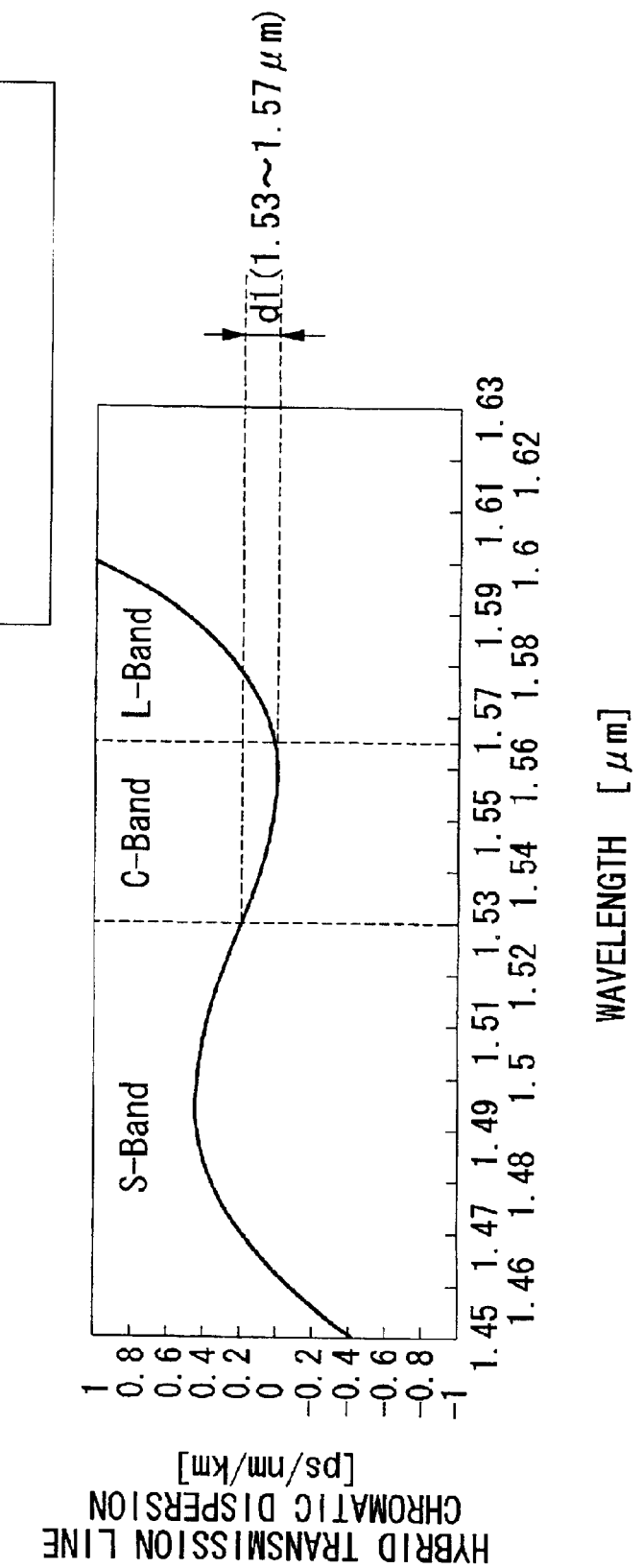
FIG. 7 is a graph showing an example of measurement of residual dispersion.

The width of residual dispersion of the vertical axis of the graphs refers to the value (d1) determined by composing a hybrid transmission line by combining with a single-mode optical fiber for transmission provided with the characteristics shown in Table 5-1 below, measuring the relationship between wavelength and chromatic dispersion in the manner of the graph shown, for example, in FIG. 7, and subtracting the minimum value from the maximum value of chromatic dispersion for each wavelength range.

The plotted points of the graphs are the results of fabricating a plurality of segment core types and W-shaped types by changing the structural parameters, constructing hybrid transmission lines and measuring the values, respectively.

These dispersion-compensating optical fibers have a cutoff wavelength that substantially allows single-mode propagation over these wavelength ranges, have bending loss of 50 dB/m or less, and are able to sufficiently withstand lateral pressure.

In addition, the used length of the dispersion-compensating optical fibers was designed so that chromatic dispersion becomes zero at a wavelength of 1.55 μm throughout the entire hybrid transmission line. In addition, the ratio of the length of each dispersion-compensating optical fiber to the length of the single-mode optical fiber for transmission was designed to be equal.

TABLE 5-1

| Transmission loss (dB/km) | Chromatic dispersion (ps/nm/km) | Dispersion slope (ps/nm²/km) | 2mλc (μm) | Aeff (μm²) | Bending loss (dB/m) |
|---|---|---|---|---|---|
| 0.186 | +20.2 | +0.062 | 1.45 | 120 | 14.4 |

Furthermore, 2mλc in the table refers to the value of cutoff wavelength as measured according to the 2m-method.

The smaller the width of residual dispersion, the smaller the wavelength dependency of chromatic dispersion of the hybrid transmission line. Namely, this means that chromatic dispersion and chromatic dispersion slope of a single-mode optical fiber for transmission is compensated over a broad wavelength band, resulting in superior dispersion compensation characteristics.

The horizontal axis indicates the Aeff of the dispersion-compensating optical fiber at a wavelength of 1.55 μm, and the larger this value, the more preferable it is from the viewpoint of suppressing non-linear effects.

Thus, it is preferable that an optical fiber be provided with characteristics plotted in the lower right corner of the graphs.

When comparing these graphs, points representing the characteristics of the segment core dispersion-compensating optical fiber are distributed farther down and to the right than the W-shaped dispersion-compensating optical fiber. Accordingly, it can be seen that an optical fiber is obtained that has superior dispersion compensation characteristics over a broad wavelength band as well as a large Aeff.

In addition, it is preferable that the dispersion-compensating optical fiber of the fifth embodiment of the present invention satisfy the conditions of (A) through (D) below for its structural parameters:

(A) $0.95 \leq \Delta_1 \leq 1.35$;
(B) $-3.5 \leq V2/V1 < 0$ and $0.5 \leq 3/V1 \leq 4.5$ when $V1=\Delta_1$, $V2=\Delta_2 \times \{(b/a)^2-1\}$ and $V3=\Delta_3 \times \{(c/a)^2-(b/a)^2\}$;
(C) α, expressed with $\alpha=-y\{x-1\}/\Delta_1$, is such that $0.10 \leq \alpha \leq 0.45$ when x=C-band y=$\Delta_3/\Delta_2$; and,
(D) the value resulting from dividing chromatic dispersion slope at a wavelength of 1.55 μm by chromatic dispersion is 0.0025 nm$^{-1}$ or more and 0.0035 nm$^{-1}$ or less.

With respect to (A) above, if $\Delta_1$ exceeds 1.35, Aeff becomes smaller, and if less than 0.95, dispersion compensation effects diminish over a broad wavelength band.

With respect to (B) above, if V2/V1 is less than −3.5, the problem results in which transmission loss increases. In addition, if V3/V1 exceeds 4.5, the cutoff wavelength becomes longer, and whether V2/V1 or V3/V1 is too large or too small, it is no longer possible to compensate chromatic dispersion slope.

(C) above is a condition for compensating chromatic dispersion over a broad wavelength band, and if α is too large, compensation is no longer possible over a broad wavelength band, while if α is too small, bending loss increases thereby weakening the resistance to microbending.

(D) above is a range that is nearly equal to the value obtained by dividing the chromatic dispersion slope by chromatic dispersion of a typical single-mode optical fiber for transmission targeted for compensation, and is a condition for compensation of chromatic dispersion of this single-mode optical fiber for transmission over a broad wavelength band.

Furthermore, even if the above conditions of (A) through (D) are satisfied, a dispersion-compensating optical fiber of the fifth embodiment of the present invention provided with preferred characteristics as indicated above cannot always be obtained. This is because the dispersion-compensating optical fiber of the fifth embodiment of the present invention is preferably obtained by combining and selecting a plurality of suitable structural parameters among those that satisfy (A) through (D) by trial and error. Consequently, it was decided to specify the dispersion-compensating optical fiber of the fifth embodiment of the present invention according to refractive index distribution pattern and characteristic values. It goes without saying that characteristics allowing compensation of positive chromatic dispersion of a single-mode optical fiber for transmission, which includes a 1.3 μm single-mode optical fiber, typically used over this type of broad wavelength band cannot be obtained with a conventional dispersion-compensating optical fiber.

More specifically, the dispersion-compensating optical fiber of the fifth embodiment of the present invention is able to compensate chromatic dispersion of, for example, a single-mode optical fiber for transmission like that indicated below.

Namely, this dispersion-compensating optical fiber has an Aeff of 40 μm² or more, positive chromatic dispersion and a cutoff wavelength that substantially allows single-mode propagation at a wavelength of 1.55 μm.

By then constructing a hybrid transmission line by combining with a single-mode optical fiber for transmission, its overall chromatic dispersion can be made to be −0.5 ps/nm/km or more and +0.5 ps/nm/km or less over a used wavelength band of a continuous range of 0.06 μm or more selected from the wavelength range of 1.45–1.63 μm.

The used length of the dispersion-compensating optical fiber in a hybrid transmission line varies according to the chromatic dispersion and used length of the single-mode optical fiber for transmission.

For example, in the compensation of a typical single-mode optical fiber for transmission having chromatic dispersion per unit length at 1.55 μm of +16 ps/nm/km to +18 ps/nm/km, by using the dispersion-compensating optical fiber of the fifth embodiment of the present invention at a ratio of about ⅓ to ⅕ the length of this single-mode optical fiber for transmission, a hybrid transmission line can be constructed that is provided with low chromatic dispersion over a broad wavelength band as described above.

More preferably, when the dispersion-compensating optical fiber of the fifth embodiment of the present invention is combined with a single-mode optical fiber for transmission having an Aeff of 70 μm² or more and chromatic dispersion of +16 ps/nm/km or more and +22 ps/nm/km or less at a wavelength of 1.55 μm, the chromatic dispersion of the entire hybrid transmission line is −0.5 ps/nm/km or more and +0.5 ps/nm/km or less, and preferably −0.2 ps/nm/km or more and +0.2 ps/nm/km or less, at a used wavelength band of a continuous range of 0.06 μm or more, and preferably 0.10 μm or more, selected from the wavelength range of 1.45–1.63 μm.

EMBODIMENTS

To begin with, the following provides an explanation of embodiments as claimed in a first embodiment of the present invention.

Embodiments as Claimed in a First Embodiment
<Embodiment 1-1>

Five types (Nos. 1 through 5) of dispersion-compensating optical fibers having the segment core refractive index distribution pattern shown in FIG. 1 were fabricated followed by evaluation of their characteristics.

The optical characteristics of the dispersion-compensating optical fibers of Nos. 1 through 5 consisting of b/a, w/a, $\Delta_1$, $\Delta_2$ and $\Delta_3$ are shown in Table 1-1.

Furthermore, the cutoff wavelength ($\lambda_c$) is the value measured according to the 2m-method of CITT. In addition, MFD is the mode field diameter.

TABLE 1-1

| No | b/a | w/a | $\Delta_1$ | $\Delta_2$ | $\Delta_3$ | Measured Wave Length (μm) | Loss (ps/nm/km) | Dispersion (ps/nm km) | Dispersion slope (ps/nm²/km) | MFD (μm) | $\lambda_c$ (μm) | FOM (ps/nm/dB) | Aeff (μm²) |
|---|---|---|---|---|---|---|---|---|---|---|---|---|---|
| 1 | 3 | 0.5 | 1 | −0.4 | 1.0 | 1.55 | 0.28 | −54.6 | −0.16 | 5.64 | 1.56 | 195 | 26.6 |
|  |  |  |  |  |  | 1.63 | 0.27 | −61.7 | −0.15 | 6.22 | 1.56 | 247 | 30.2 |
| 2 | 2.9 | 0.7 | 1 | −0.4 | 0.7 | 1.55 | 0.3 | −55.1 | −0.16 | 5.65 | 1.54 | 184 | 26.5 |
|  |  |  |  |  |  | 1.63 | 0.28 | −62.1 | −0.15 | 6.27 | 1.54 | 222 | 30.5 |
| 3 | 3 | 1 | 1.2 | −0.4 | 0.5 | 1.55 | 0.32 | −69.2 | −0.20 | 5.22 | 1.41 | 218 | 21.9 |
|  |  |  |  |  |  | 1.63 | 0.29 | −79.2 | −0.19 | 5.84 | 1.41 | 273 | 28.1 |
| 4 | 3 | 1 | 1.2 | −0.4 | 0.6 | 1.55 | 0.32 | −69.8 | −0.21 | 5.23 | 1.67 | 218 | 22.5 |
|  |  |  |  |  |  | 1.63 | 0.29 | −77.0 | −0.19 | 5.86 | 1.67 | 265 | 27.5 |
| 5 | 3 | 1 | 1.2 | −0.4 | 0.4 | 1.55 | 0.31 | −71.6 | −0.20 | 5.24 | 1.15 | 231 | 21.9 |
|  |  |  |  |  |  | 1.63 | 0.30 | −82.5 | −0.20 | 5.88 | 1.15 | 273 | 27.1 |

According to Table 1-1, all of the dispersion-compensating optical fibers satisfied the characteristics of the first embodiment of the present invention.

Continuing, when a 1.3 μm single-mode optical fiber (chromatic dispersion of +17 ps/nm/km and dispersion slope of 0.06 ps/nm²/km at 1.55 μm) was compensated using these dispersion-compensating optical fibers, the results shown in Table 1-2 were obtained, and chromatic dispersion and dispersion slope of the 1.3 μm single-mode optical fiber were able to be compensated over a range of 1.53–1.63 μm.

TABLE 1-2

| Measurement wavelength | Used distance (km) 1.3 μm SMF | Used distance (km) Dispersion-compensating optical fiber | Overall chromatic dispersion (ps/nm/km) | Overall dispersion slope (ps/nm²/km) |
|---|---|---|---|---|
| No. 1 1.53 μm | 10 | 3.36 | −0.29 | −0.003 |
| 1.63 μm |  |  | −0.50 | −0.008 |
| No. 2 1.53 μm | 10 | 3.35 | −0.38 | −0.002 |
| 1.63 μm |  |  | 0.45 | 0.008 |
| No. 3 1.53 μm | 10 | 2.65 | −0.34 | −0.005 |
| 1.63 μm |  |  | 0.33 | 0.008 |
| No. 4 1.53 μm | 10 | 2.68 | −0.49 | −0.004 |
| 1.63 μm |  |  | 0.50 | 0.007 |

TABLE 1-2-continued

| Measurement wavelength | Used distance (km) 1.3 μm SMF | Used distance (km) Dispersion-compensating optical fiber | Overall chromatic dispersion (ps/nm/km) | Overall dispersion slope (ps/nm²/km) |
|---|---|---|---|---|
| No. 5 1.53 μm | 10 | 2.55 | −0.30 | −0.002 |
| 1.63 μm |  |  | 0.30 | 0.008 |

COMPARATIVE EXAMPLE 1-1

A dispersion-compensating optical fiber of the prior art having the matched cladding refractive index distribution pattern, which is provided with a core and a cladding provided around an outer periphery of the core, was fabricated. Furthermore, a relative refractive index difference between the core and the cladding was set at 2.5%. The optical characteristics of the resulting dispersion-compensating optical fiber are shown in Table 1-3.

TABLE 1-3

| Fiber structure | Matched cladding pattern | |
|---|---|---|
| Measurement wavelength | 1.55 μm | 1.63 μm |
| Loss | 0.37 dB/km | 0.35 dB/km |
| Dispersion value | −75 ps/nm/km | −69.5 ps/nm/km |
| Dispersion slope | +0.09 ps/nm²/km | +0.10 ps/nm²/km |
| MFD | 4.4 μm | 4.8 μm |
| FOM | 202 ps/nm/dB | 198 ps/nm/dB |
| Aeff | 14.8 μm² | 17.7 μm² |

COMPARATIVE EXAMPLE 1-2

A dispersion-compensating optical fiber having the W-shaped refractive index distribution pattern shown in FIG. 2 was fabricated. Furthermore, $2a_1$ was set at 2.5, $b_1/a_1$ at 2.5, $\Delta_{11}$ at 0.35 and $\Delta_{12}$ at 2.5. Optical characteristics are shown in Table 1-4. Furthermore, bending loss for light at 1.63 μm was large and light was unable to be transmitted.

TABLE 1-4

| Fiber structure | W-shaped |
|---|---|
| Measurement wavelength | 1.55 µm |
| Loss | 0.45 dB/km |
| Dispersion value | −138 ps/nm/km |
| Dispersion slope | −0.49 ps/nm²/km |
| MFD | 3.9 µm |
| FOM | 300 ps/nm/dB |
| Aeff | 12 µm² |

According to Tables 1-3 and 1-4, the values of Aeff for both of the dispersion-compensating optical fibers of Comparative Examples 1-1 and 1-2 were small.

The following provides an explanation of embodiments as claimed in a second embodiment of the present invention.

Embodiments as Claimed in a Second Embodiment

COMPARATIVE EXAMPLE 2-1

A cylindrical porous body provided with a first layer comprised of $GeO_2$-doped quartz glass and a second layer comprised of $SiO_2$ provided around an outer periphery of said first layer was fabricated by a known method such as VAD or MCVD. Furthermore, the ratio of the diameter of the second layer to the diameter of the first layer was 4.0.

This porous body was subjected to dehydration treatment with He and chlorine gas in an atmosphere of about 1000° C. followed by simultaneously doping with fluorine and transparent vitrification in an atmosphere of He at 5 l/min and $SiF_4$ at 1 l/min to fabricate a rod.

This rod was then drawn to form a core base material, and a porous body composed of $SiO_2$ for cladding was attached around it followed by dehydration treatment with He and chlorine gas in an atmosphere of about 1000° C. and then transparent vitrification in a He atmosphere to fabricate a fiber base material. Subsequently, the fiber base material was drawn to produce a dispersion-compensating optical fiber having the W-shape refractive index distribution pattern shown in FIG. 2.

The optical characteristics of this dispersion-compensating optical fiber at a used wavelength of 1.55 µm are shown in Table 2-1. MFD in Table 2-1 refers to the mode field diameter, while wavelength refers to the wavelength at which optical characteristics were measured (used wavelength).

TABLE 2-1

| No. | 1 |
|---|---|
| $\Delta_{11}$ | 0.8 |
| $\Delta_{12}$ | −0.48 |
| a1:b1 | 1:2 |
| Wavelength | 1.55 |
| Core radius (µm) | 4.5 |
| Cutoff wavelength (µm) | 0.89 |
| Aeff (µm²) | 25.1 |
| MFD (µm) | 5.7 |
| Bending loss (dB/m) 2R = 20 mm | 31.3 |
| Chromatic dispersion (ps/nm/km) | −16.2 |
| Dispersion slope (ps/nm²/km) | −0.057 |
| Dispersion slope compensation rate (%) | 100 |

Dispersion slope compensation rate in Table 2-1 refers to the ratio of the absolute value of dispersion slope per unit length of the dispersion-compensating optical fiber to the absolute value of dispersion slope per unit length of a 1.3 µm single-mode optical fiber.

Furthermore, the typical chromatic dispersion at 1.55 µm of a 1.3 µm single-mode optical fiber is +17 ps/nm/km, and the typical dispersion slope is +0.060 ps/nm²/km.

According to Table 2-1, since the chromatic dispersion of this dispersion-compensating optical fiber is −16.2 ps/nm/km, for the sake of convenience, the chromatic dispersion of the 1.3 µm single-mode optical fiber was assumed to be zero, and the used length of the dispersion-compensating optical fiber that allowed complete compensation was 1.05 km.

Since the dispersion slope of this dispersion-compensating optical fiber is −0.057 ps/nm²/km, the dispersion slope of the dispersion-compensating optical fiber at this used length (1.05 km) is −0.060 ps/nm², and it was found that the dispersion slope of 1 km of the above 1.3 µm single-mode optical fiber is able to be completely compensated.

Next, this dispersion-compensating optical fiber was connected to a 1.3 µm single-mode optical fiber at the same used length ratio to construct a transmission path over a total length of 45 km.

The Aeff of the dispersion-compensating optical fiber used in the latter half of this transmission path is 25.1 µm² and the Aeff is small, deterioration of transmission characteristics due to non-linear effects is large, and it was found to be difficult to increase transmission capacity, increase transmission distance and apply this transmission path to long-distance, large capacity transmission.

<Embodiment 2-1>

Rods were fabricated in the same manner as the comparative examples while changing the size of each layer and so forth. Next, the rods were drawn, a porous body composed of $GeO_2$-doped quartz glass and $SiO_2$ for the ring core portion and cladding were was attached around the rods, and the rods were subjected to dehydration treatment with He and chlorine gas in an atmosphere of about 1000° C. followed by transparent vitrification in an He atmosphere to obtain base materials. The base materials were then drawn to produce dispersion-compensating optical fibers provided with the refractive index distribution shown in FIG. 1.

The structural parameters and optical characteristics at a used wavelength of 1.55 µm of the resulting dispersion-compensating optical fibers are shown in Tables 2-2 and 2-3.

TABLE 2-2

| No. | 2 | 3 | 4 | 5 | 6 |
|---|---|---|---|---|---|
| $\Delta_1$ | 0.65 | 0.75 | 0.70 | 0.70 | 0.80 |
| $\Delta_2$ | −0.50 | −0.35 | −0.40 | −0.50 | −0.30 |
| $\Delta_3$ | 0.50 | 0.70 | 0.45 | 0.65 | 0.80 |
| a:b:c | 1:2.1:2.8 | 1:2.7:3.3 | 1:2.3:3.2 | 1:2.2:2.8 | 1:2.5:3.0 |
| Wavelength | 1.55 | 1.55 | 1.55 | 1.55 | 1.55 |
| Core radius (µm) | 7.8 | 7.9 | 8.3 | 7.6 | 7.1 |
| Cutoff wavelength (µm) | 1.57 | 1.69 | 1.69 | 1.64 | 1.54 |
| Aeff (µm²) | 38.3 | 35.5 | 36.4 | 35.3 | 30.9 |
| MFD (µm) | 6.7 | 6.5 | 6.6 | 6.4 | 6.1 |
| Bending loss (dB/m) 2R = 20 mm | 38.5 | 39.4 | 22.4 | 12.9 | 8.2 |
| Chromatic dispersion (ps/nm/km) | −18.4 | −30.8 | −22.1 | −18.8 | −24.8 |

TABLE 2-2-continued

| No. | 2 | 3 | 4 | 5 | 6 |
|---|---|---|---|---|---|
| Dispersion slope (ps/nm²/km) | −0.05 | −0.09 | −0.06 | −0.06 | −0.06 |

TABLE 2-3

| No. | 2 | 3 | 4 | 5 | 6 |
|---|---|---|---|---|---|
| Dispersion slope compensation rate (%) | 77 | 83 | 77 | 90 | 69 |
| Used length (km) | 0.92 | 0.55 | 0.77 | 0.90 | 0.69 |
| Chromatic dispersion of entire transmission path (ps/nm/km) | 0 | 0 | 0 | 0 | 0 |
| Dispersion slope of entire transmission path (ps/nm²/km) | +0.014 | +0.010 | +0.014 | +0.006 | +0.019 |

According to the results shown in Tables 2-2 and 2-3, all of the dispersion-compensating optical fibers of numbers 2 through 6 as claimed in a second embodiment of the present invention were able to compensate chromatic dispersion and dispersion slope of a standard 1.3 μm single-mode optical fiber.

Furthermore, for the sake of convenience, the used length in Table 2-3 refers to the used length of the dispersion-compensating optical fiber that allows complete compensation assuming the chromatic dispersion of the 1.3 μm single-mode optical fiber of 1 km to be zero.

In addition, chromatic dispersion or dispersion slope of the entire transmission path refers to the chromatic dispersion or dispersion slope per unit length when a dispersion-compensating optical fiber of the above used length was connected to a 1 km 1.3 μm single-mode optical fiber.

In addition, a transmission path was constructed having a total length of 45 km by connecting a 1.3 μm single-mode optical fiber and dispersion-compensating optical fiber at the same used length ratio. Since the Aeff of the dispersion-compensating optical fiber used in the latter half of this transmission path was large at 30 μm² or more, there was little deterioration of transmission characteristics due to non-linear effects, and this transmission path was found to be able to perform long-distance, large capacity transmission by increasing the transmission capacity or increasing the transmission distance.

In addition, the dispersion-compensating optical fiber allows single-mode propagation at the used length used for the transmission path.

The following provides an explanation of embodiments as claimed in a third embodiment of the present invention.

Embodiments as Claimed in a Third Embodiment
<Embodiment 3-1>

COMPARATIVE EXAMPLE 3-1

A fiber base material was fabricated in accordance with known methods such as VAD, MCVD and PCVD after which it was drawn to produce five types of dispersion-compensating optical fibers (A through E: Embodiments, F: Comparative Example).

These dispersion-compensating optical fibers were provided with the refractive index distribution pattern shown in FIG. 1, and the values for $\Delta_1$, $\Delta_2$, $\Delta_3$, b/a and c/a were set to the values shown in Table 3-1 for each of the dispersion-compensating optical fibers.

In addition, the central core portion 1 and the ring core portion 3 were formed from germanium-doped quartz glass, the intermediate core portion 2 was formed from fluorine-doped quartz glass, and the cladding 5 was formed from fluorine-doped quartz glass. The fluorine concentration of the cladding 5 was such that the relative refractive index difference based on the refractive index of pure quartz glass was 0.1%.

The conditions for drawing consisted of a drawing speed of 300 m/min, drawing tension of 250 g and heating temperature of 2000° C.

However, although drawing was able to be performed without incident for the dispersion-compensating optical fibers of embodiments A through E, due to the high loss of the dispersion-compensating optical fiber of comparative example F having a large value for $\Delta_1$, drawing conditions were changed to a drawing speed of 300 m/min, drawing tension of 350 g and heating temperature of 1900° C. However, there was a problem with mechanical strength.

The optical characteristics of these dispersion-compensating optical fibers are collectively shown in Table 3-1.

TABLE 3-1

| No. | Δ1 (%) | Δ2 (%) | Δ3 (%) | b/a | c/b | Core radius (μm) | Used Wavelength (μm) | Aeff (μm²) | Transmission loss (dB/km) |
|---|---|---|---|---|---|---|---|---|---|
| A | 1.0 | −0.40 | 0.90 | 3.0 | 3.5 | 6.7 | 1.55 | 25.4 | 0.28 |
| B | 1.0 | −0.40 | 1.0 | 3.0 | 3.5 | 6.8 | 1.55 | 26.6 | 0.29 |
| C | 1.1 | −0.40 | 0.80 | 3.0 | 3.5 | 6.2 | 1.55 | 22.9 | 0.28 |
| D | 1.0 | −0.40 | 0.70 | 2.9 | 3.6 | 7.0 | 1.55 | 26.5 | 0.28 |
| E | 1.2 | −0.40 | 0.40 | 3.0 | 4.0 | 6.7 | 1.55 | 20.8 | 0.30 |
| F | 2.3 | −0.40 | 0 | 4.0 | — | 4.1 | 1.55 | 12.2 | 0.40 |

| Chromatic dispersion (ps/nm/km) | Dispersion slope (ps/nm²/km) | Bending loss (dB/m) 2R = 20 mm | Cutoff wavelength (μm) |
|---|---|---|---|
| −52.8 | −0.17 | 26.1 | 1.55 |
| −54.6 | −0.16 | 16.5 | 1.53 |
| −56.8 | −0.16 | 21.8 | 1.60 |
| −55.1 | −0.16 | 15.3 | 1.61 |
| −63.4 | −0.19 | 11.3 | 1.59 |
| −127.7 | −0.32 | 8.3 | 0.76 |

The transmission loss of dispersion-compensating optical fibers A through E was low ranging from 0.25 to 0.30 dB/km, and Aeff values were large at 20 μm² or more, making these optical fibers suitable for large-capacity and long-distance transmission.

On the other hand, even if the dispersion-compensating optical fiber of F was drawn at a level at which problems with mechanical strength occur, transmission loss was large at 0.40 dB/m. In addition, Aeff was small.

Furthermore, cutoff wavelength indicates the value determined by the 2 m-method, and in the long states in optical fibers are normally used, values were obtained that were able to guarantee single-mode propagation.

<Embodiment 3-2>

A hybrid transmission line was constructed by arranging 30 km of the following single-mode optical fiber in the former stage, and connecting 11.6 km of the dispersion-compensating optical fiber of A produced in Embodiment 3-1 in the latter stage.

Namely, the single-mode optical fiber was produced by drawing a fiber base material fabricated in accordance with known methods such as VAD and MCVD.

This single-mode optical fiber had the refractive index distribution pattern shown in FIG. 2, the central core was composed of germanium-doped quartz glass, the intermediate core portion was composed of fluorine-doped quartz glass, and the cladding was composed of pure quartz glass.

In addition, $\Delta_{11}$ and $\Delta_{12}$ were 0.24% and −0.05%, respectively, a and b were 6.6 μm and 26.5 μm, respectively, and the cladding outer diameter was 125 μm.

The characteristics of this single-mode optical fiber are shown in Table 3-2.

and $SiO_2$ cladding (cladding diameter/core diameter= 2.0–2.2). However, the core and cladding referred to here do not correspond to the core and cladding in an actual dispersion-compensating optical fiber, but rather are names used for the sake of convenience to indicate each layer of a two-layer structure. In other words, the central portion is referred to as the core (portion serving as the central core portion 21), and the portion surrounding it is referred to as the cladding (portion serving as the intermediate core portion 22).

After subjecting this porous body to dehydration treatment with He and chlorine gas in an atmosphere at 1000° C., fluorine doping and transparent vitrification were simultaneously performed in an atmosphere of He at 5 l/min and $SiF_4$ at 1 l/min. The resulting rod was then drawn to form a core material, after which porous bodies comprised of $SiO_2$—$GeO_2$ and $SiO_2$ were attached to the outside for the ring core and side ring core portions and for the cladding, respectively. This was followed by dehydration treatment with He and chlorine gas in an atmosphere at 1000° C. and

TABLE 3-2

| $\Delta_{11}$ | $\Delta_{12}$ | b1/a1 | Used wavelength (μm) | Aeff (μm²) | Transmission loss (dB/km) | Chromatic dispersion (ps/nm/km) | Dispersion slope (ps/nm²/km) | Bending loss (dB/m) 2R = 20 mm | Cutoff wavelength (μm) |
|---|---|---|---|---|---|---|---|---|---|
| 0.24 | −0.05 | 4.0 | 1.55 | 132 | 0.188 | +20.4 | +0.062 | 10.2 | 1.50 |

Chromatic dispersion at a wavelength of 1.55 μm was nearly zero for this hybrid transmission line. In addition, dispersion slope was 0.1 ps/nm²/km or less over a range of 1.53–1.63 μm, and the compensation rate of dispersion slope was nearly 100%.

Due to the large value of Aeff of the single-mode optical fiber of the former stage, this hybrid transmission line has low non-linearity, and due to the action of the dispersion-compensating optical fiber, both chromatic dispersion and dispersion slope are small, resulting in the obtaining of satisfactory transmission characteristics.

In this third embodiment of the present invention, since the relative refractive index difference of the layer in which is provided with the highest refractive index of the core is small, an optical fiber can be obtained having low loss by drawing at lower tension than that of the prior art. In addition, the occurrence of non-linear effects can be suppressed by enlarging Aeff.

In addition, the dispersion-compensating optical fiber of the third embodiment of the present invention can be used to construct a hybrid transmission line suitable for wavelength division multiplexing transmission or long-distance transmission by combining with a single-mode optical fiber.

The following provides an explanation of embodiments as claimed in a fourth embodiment of the present invention.

Embodiments as Claimed in a Fourth Embodiment

<Embodiment 4-1>

Dispersion-compensating optical fibers provided with the refractive index distribution pattern shown in FIG. 3 were produced.

To begin with, a cylindrical porous body was fabricated by VAD having a structure consisting of a $GeO_2$-doped core transparent vitrification in an He atmosphere to obtain fiber base materials having an outer diameter of 50 mm.

These fiber base materials were then drawn to produce dispersion-compensating optical fibers having an outer diameter of 125 μm. The drawing speed at this time was set at 300 m/min, drawing tension to 200 g, and heating temperature to 1950° C.

In this Embodiment 4-1, five types of dispersion-compensating optical fibers having different structural parameters were produced using a similar method. The structural parameters and optical characteristics of each optical fiber are shown in Table 4-1 and Table 4-2.

TABLE 4-1

| Sample No. | $\Delta_{21}$ (%) | $\Delta_{22}$ (%) | $\Delta_{23}$ (%) | $\Delta_{24}$ (%) | B/a | c/a | d/a | Core diameter (μm) | Aeff (μm²) @ 1550 nm |
|---|---|---|---|---|---|---|---|---|---|
| 1 | 0.95 | −0.52 | 0.10 | −0.5 | 2.0 | 7.0 | 8.5 | 34.4 | 26.8 |
| 2 | 0.95 | −0.52 | 0.12 | −0.5 | 2.0 | 6.4 | 7.9 | 32.6 | 26.3 |
| 3 | 0.95 | −0.44 | 0.12 | −0.5 | 2.2 | 6.4 | 7.9 | 31.7 | 26.3 |
| 4 | 0.95 | −0.48 | 0.14 | −0.5 | 2.2 | 6.0 | 7.5 | 30.3 | 26.5 |
| 5 | 0.95 | −0.50 | 0.22 | −0.3 | 2.2 | 5.0 | 6.5 | 27.3 | 27.4 |

TABLE 4-2

| Sample No. | Transmission loss (dB/km) @ 1550 nm | Chromatic dispersion (ps/nm/km) @ 1550 nm | Dispersion slope (ps/nm²/km) @ 1550 nm | Cutoff wavelength in 2m-method (μm) | Bending loss (dB/km) @ 1550 nm | Bending loss (dB/km) @ 1630 nm |
|---|---|---|---|---|---|---|
| 1 | 0.34 | −54.0 | −0.17 | 1.58 | 7.5 | 48 |
| 2 | 0.34 | −49.2 | −0.15 | 1.61 | 3.6 | 27 |
| 3 | 0.33 | −49.0 | −0.15 | 1.53 | 5.7 | 39 |
| 4 | 0.33 | −54.0 | −0.17 | 1.55 | 6.5 | 44 |
| 5 | 0.34 | −54.0 | −0.16 | 1.65 | 3.8 | 34 |

According to the results of Table 4-1 and Table 4-2, non-linear effects were able to be suppressed by enlarging Aeff. In addition, small values were also obtained for bending loss at a wavelength of 1.63 μm.

Furthermore, there were no problems with mechanical strength for any of these dispersion-compensating optical fibers under their respective drawing conditions.

COMPARATIVE EXAMPLE 4-1

Dispersion-compensating optical fibers provided with the segment core refractive index distribution pattern shown in FIG. 1 were produced.

To begin with, a cylindrical porous body was fabricated by VAD having a structure consisting of a $GeO_2$-doped core and $SiO_2$ cladding (cladding diameter/core diameter= 2.2–2.4). However, the core and cladding referred to here do not correspond to the core and cladding in an actual dispersion-compensating optical fiber, but rather are names used for the sake of convenience to indicate each layer of a two-layer structure. In other words, the central portion is referred to as the core (portion serving as the central core portion 1), and the portion surrounding it is referred to as the cladding (portion serving as intermediate core portion 2).

After subjecting this porous body to dehydration treatment with He and chlorine gas in an atmosphere at 1000° C., fluorine doping and transparent vitrification were simultaneously performed in an atmosphere of He at 5 l/min and $SiF_4$ at 1 l/min. The resulting rod was then drawn to form a core material, after which porous bodies comprised of $SiO_2$—$GeO_2$ and $SiO_2$ were attached to the outside for the ring core and for the cladding, respectively. This was followed by dehydration treatment with He and chlorine gas in an atmosphere at 1000° C. and transparent vitrification in an He atmosphere to obtain an intermediate core portion. Moreover, a porous body comprised of $SiO_2$ was attached around this followed by dehydration treatment with He and chlorine gas in an atmosphere at 1000° C. and then transparent vitrification in an He atmosphere to produce fiber base materials having an outer diameter of 50 mm.

These fiber base materials were then drawn to produce dispersion-compensating optical fibers having an outer diameter of 125 μm. The drawing speed at this time was set at 300 m/min, drawing tension to 200 g, and heating temperature to 1950° C.

The optical characteristics at 1.55 μm of these dispersion-compensating optical fibers are shown in Tables 4-3 and 4-4.

TABLE 4-3

| Sample No. | $\Delta_1$ (%) | $\Delta_2$ (%) | $\Delta_3$ (%) | b/a | c/a | Core diameter (μm) | Aeff (μm²) @ 1550 nm |
|---|---|---|---|---|---|---|---|
| 6 | 0.95 | −0.50 | 0.24 | 2.2 | 4.2 | 23.9 | 27.5 |
| 7 | 0.95 | −0.48 | 0.34 | 2.4 | 3.8 | 32.5 | 27.5 |
| 8 | 0.95 | −0.58 | 0.62 | 2.4 | 3.2 | 20.0 | 27.6 |
| 9 | 0.95 | −0.54 | 0.28 | 2.2 | 3.8 | 22.3 | 27.3 |
| 10 | 0.95 | −0.58 | 0.30 | 2.2 | 3.6 | 21.4 | 26.5 |

TABLE 4-4

| Sample No. | Transmission loss (dB/km) @ 1550 nm | Chromatic dispersion (ps/nm/km) @ 1550 nm | Dispersion slope (ps/nm²/km) @ 1550 nm | Cutoff wavelength in 2m-method (μm) | Bending loss (dB/km) @ 1550 nm | Bending loss (dB/km) @ 1630 nm |
|---|---|---|---|---|---|---|
| 6 | 0.33 | −54 | −0.17 | 1.64 | 8.8 | 81 |
| 7 | 0.32 | −54 | −0.17 | 1.60 | 11.0 | 100 |
| 8 | 0.35 | −54 | −0.15 | 1.57 | 9.7 | 88 |
| 9 | 0.34 | −54 | −0.15 | 1.53 | 10.0 | 91 |
| 10 | 0.35 | −54 | −0.16 | 1.43 | 15.0 | 122 |

The goal of these dispersion-compensating optical fibers was to have an Aeff value or cutoff wavelength comparable to the dispersion-compensating optical fibers shown in Embodiment 4-1 and as small a value as possible for bending loss.

According to the results of Table 4-3 and Table 4-4, bending loss in the vicinity of a wavelength of 1.55 μm was sufficiently small, and was determined not to present a problem. However, bending loss at a wavelength of 1.63 μm was large, and transmission loss was also found to be large.

The following provides an explanation of embodiments as claimed in a fifth embodiment of the present invention.

Embodiments as Claimed in a Fifth Embodiment (Embodiment 5-1)

A dispersion-compensating optical fiber having the reflective index distribution pattern shown in FIG. 1 was produced. Its optical characteristics are shown in Table 5-2, and those characteristics were found to be satisfactory.

TABLE 5-2

| Core diameter (c) (µm) | $\Delta_1$ | $\Delta_2$ | $\Delta_3$ | b/a | c/a |
|---|---|---|---|---|---|
| 14.7 | 1.1 | −0.56 | 0.12 | 2.2 | 4 |

| Transmission loss (dB/km) | Chromatic dispersion (ps/nm/km) | Dispersion slope (ps/nm²/km) | 2m λc (µm) | Aeff (µm²) | Bending loss (dB/m) |
|---|---|---|---|---|---|
| 0.302 | −54 | −0.163 | 0.86 | 21.2 | 16.6 |

A hybrid transmission line was then constructed by combining 13.6 km of this dispersion-compensating optical fiber with 36.4 km of the single-mode optical fiber for transmission provided with the characteristics shown in Table 5-1. Furthermore, the used lengths of these optical fibers were set so that the chromatic dispersion of the entire hybrid transmission line at a wavelength of 1.55 µm was zero.

Figure 8A:
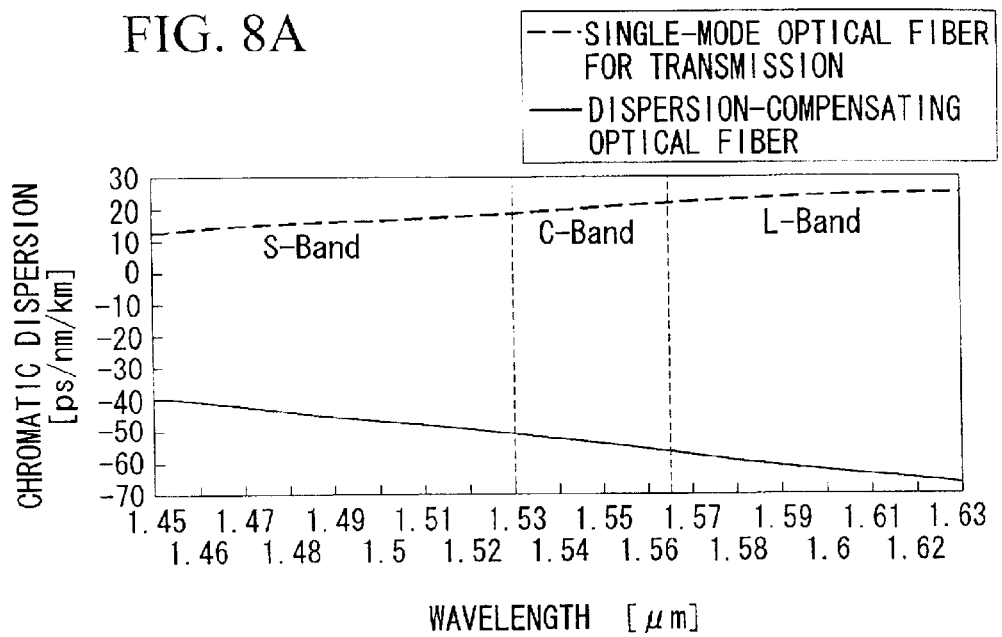
Figure 8B:
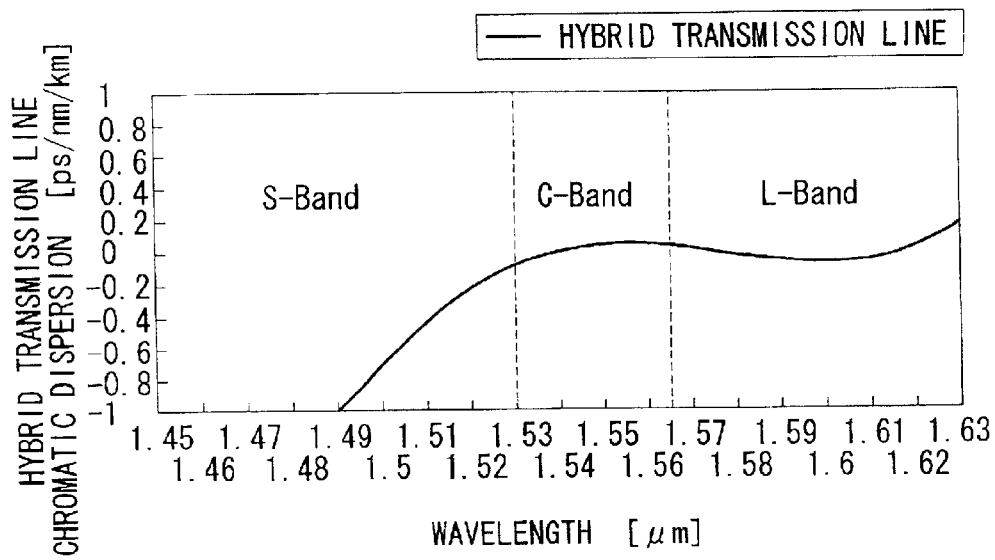
FIG. 8B is a graph showing the relationship between wavelength and chromatic dispersion of a hybrid transmission line.

FIG. 8A is a graph showing the relationship between wavelength and chromatic dispersion of the dispersion-compensating optical fiber and the single-mode optical fiber for transmission, while FIG. 8B is a graph showing the relationship between wavelength and chromatic dispersion of the hybrid transmission line.

A hybrid transmission line was able to be constructed having a low level of chromatic dispersion within a range of −0.15 to +0.1 ps/nm/km over a broad range of about 0.1 µm extending from the C-band to the L-band.

(Embodiment 5-2)

A dispersion-compensating optical fiber having the refractive index distribution pattern shown in FIG. 1 was produced. Its optical characteristics are shown in Table 5-3, and those characteristics were found to be satisfactory.

TABLE 5-3

| Core diameter (c) (µm) | $\Delta_1$ | $\Delta_2$ | $\Delta_3$ | b/a | c/a |
|---|---|---|---|---|---|
| 13.2 | 1.1 | −0.52 | 0.68 | 2.6 | 3.4 |

| Transmission loss (dB/km) | Chromatic dispersion (ps/nm/km) | Dispersion slope (ps/nm²/km) | 2m λc (µm) | Aeff (µm²) | Bending loss (dB/m) |
|---|---|---|---|---|---|
| 0.298 | −54 | −0.171 | 1.59 | 22.7 | 0.8 |

A hybrid transmission line was then constructed by combining 13.6 km of this dispersion-compensating optical fiber with 36.4 km of the single-mode optical fiber for transmission provided with the characteristics shown in Table 5-1. Furthermore, the used lengths of these optical fibers were set so that the chromatic dispersion of the entire hybrid transmission line at a wavelength of 1.55 µm was zero.

Figure 9A:
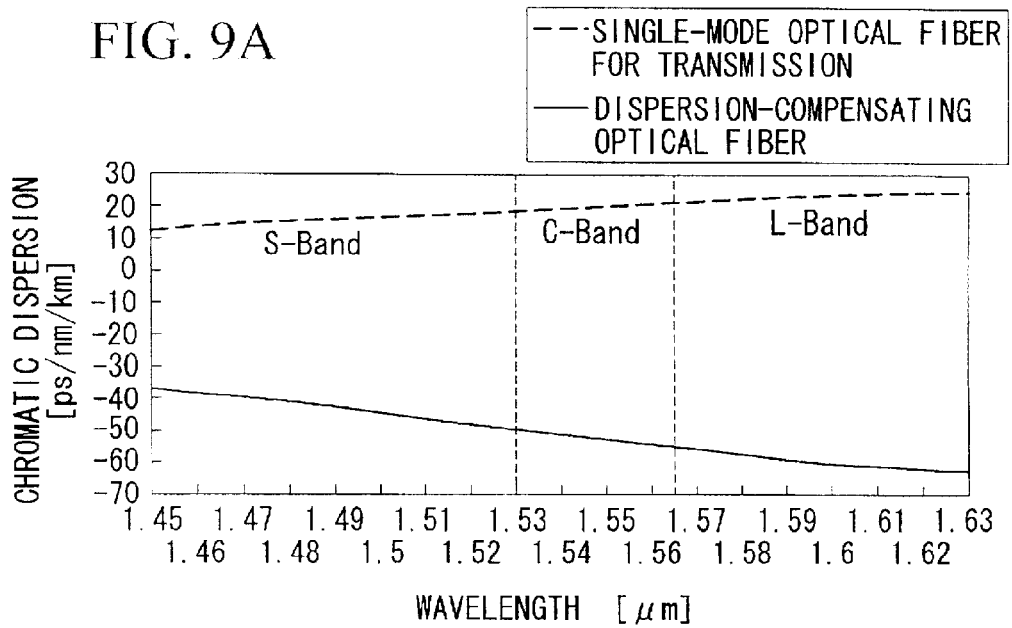
Figure 9B:
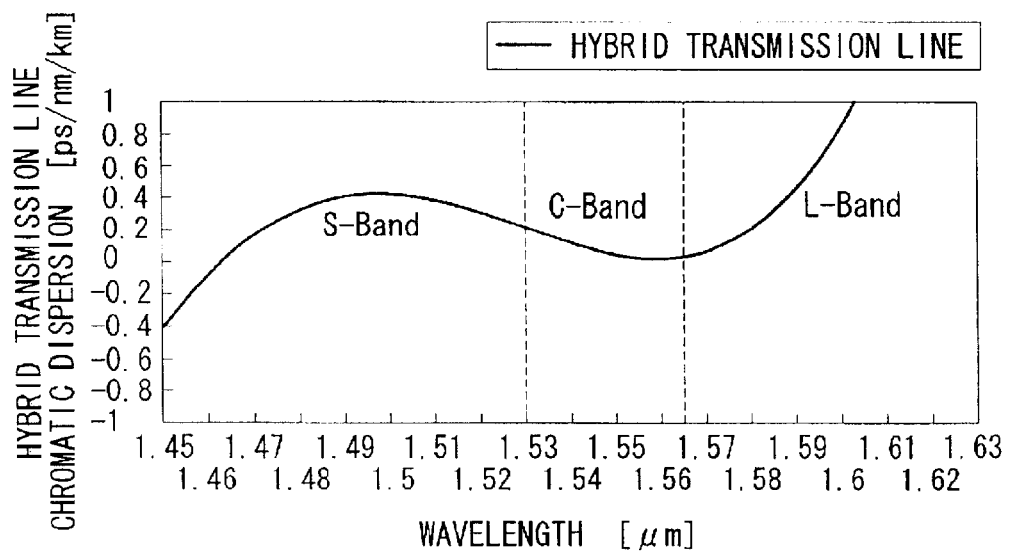
FIG. 9B is a graph showing the relationship between wavelength and chromatic dispersion of a hybrid transmission line.

FIG. 9A is a graph showing the relationship between wavelength and chromatic dispersion of the dispersion-compensating optical fiber and the single-mode optical fiber for transmission, while FIG. 9B is a graph showing the relationship between wavelength and chromatic dispersion of the hybrid transmission line.

A hybrid transmission line was able to be constructed having a low level of chromatic dispersion within a range of −0.4 to +0.4 ps/nm/km over a broad range of about 0.115 µm extending from the S-band to the C-band.

COMPARATIVE EXAMPLE 5-1

A dispersion-compensating optical fiber having the W-shaped refractive index distribution pattern shown in FIG. 2 was produced. Its optical characteristics are shown in Table 5-4, and those characteristics were found to be satisfactory.

TABLE 5-4

| Core diameter (c) (µm) | $\Delta_{11}$ | $\Delta_{12}$ | $b_1/a_1$ |
|---|---|---|---|
| 7.9 | 1.24 | −0.5 | 2.4 |

| Transmission loss (dB/km) | Chromatic dispersion (ps/nm/km) | Dispersion slope (ps/nm²/km) | 2m λc (µm) | Aeff (µm²) | Bending loss (dB/m) |
|---|---|---|---|---|---|
| 0.311 | −54 | −0.161 | 0.83 | 18.1 | 20.9 |

A hybrid transmission line was then constructed by combining 13.6 km of this dispersion-compensating optical fiber with 36.4 km of the single-mode optical fiber for transmission provided with the characteristics shown in Table 5-1. Furthermore, the used lengths of these optical fibers were set so that the chromatic dispersion of the entire hybrid transmission line at a wavelength of 1.55 µm was zero.

Figure 10A:
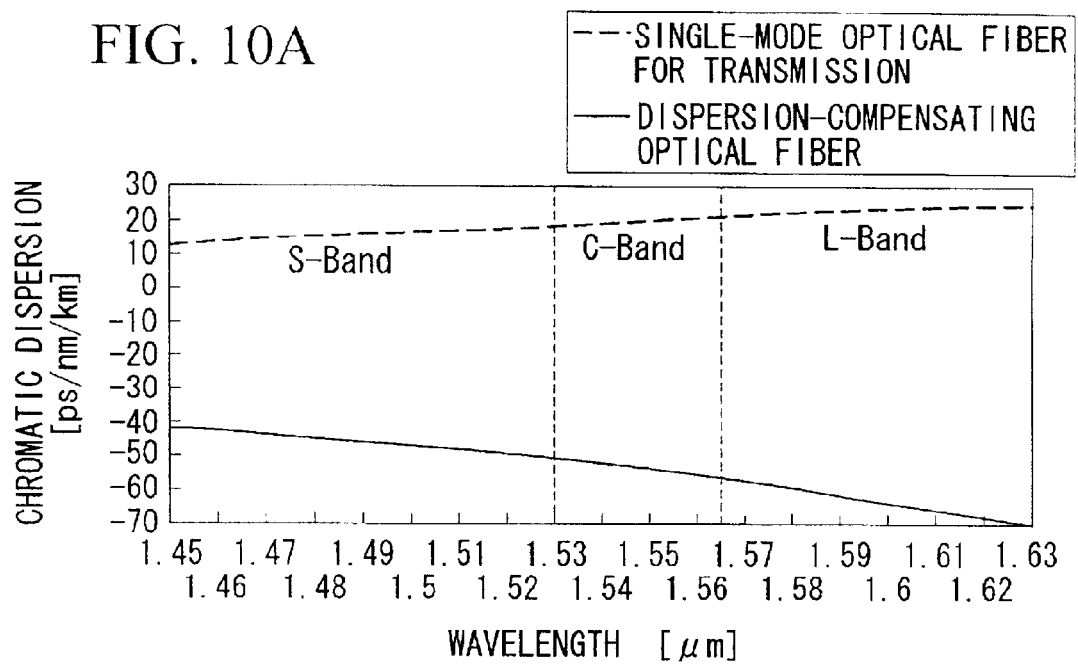
Figure 10B:
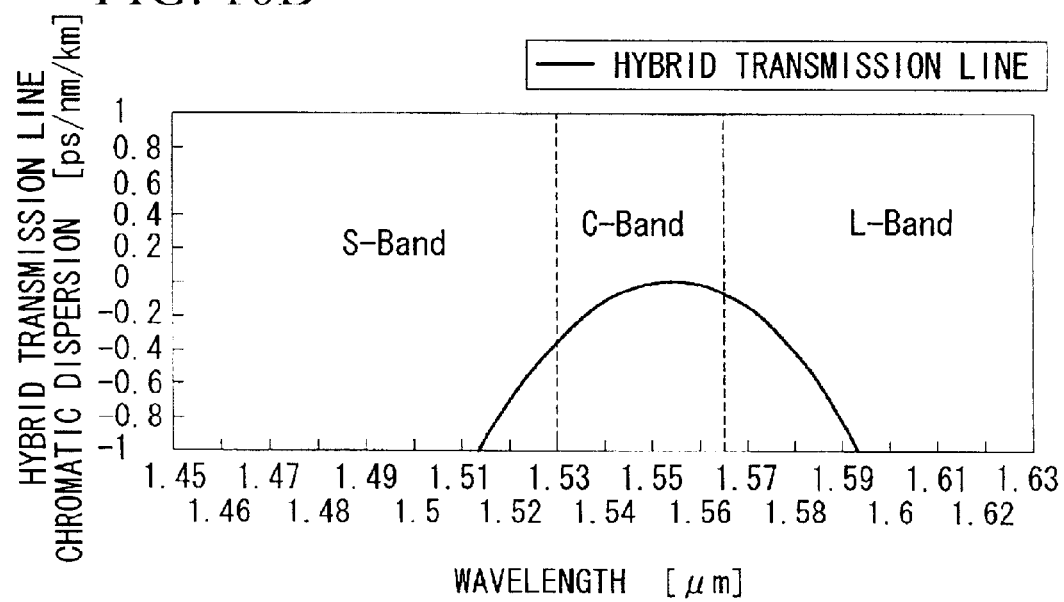
FIG. 10B is a graph showing the relationship between wavelength and chromatic dispersion of a hybrid transmission line.

FIG. 10A is a graph showing the relationship between wavelength and chromatic dispersion of the dispersion-compensating optical fiber and the single-mode optical fiber for transmission, while FIG. 10B is a graph showing the relationship between wavelength and chromatic dispersion of the hybrid transmission line.

Although chromatic dispersion of the entire transmission path was able to be reduced to −0.3–0 ps/nm/km in the C-band, chromatic dispersion was on the order of several ps/nm/km in other wavelength bands.

According to the results of the above embodiments and comparative examples, the embodiments as claimed in the fifth embodiment of the present invention were clearly able to compensate chromatic dispersion of a single-mode optical fiber for transmission over a broad wavelength band, as well as suppress non-linear effects by enlarging Aeff.

What is claimed is:

1. A dispersion-compensating optical fiber wherein,
a core and a cladding provided around an outer periphery of said core are provided,
said core is provided with a central core portion having a refractive index higher than said cladding, an intermediate core portion provided around an outer periphery of said central core portion having a refractive index lower than said cladding, and a ring core portion provided around an outer periphery of said intermediate core portion having a refractive index higher than said cladding, at a wavelength of 1.55 μm, chromatic dispersion is −40 ps/nm/km or less and −65 ps/nm/km or more, chromatic dispersion slope is negative, effective area is 18 μm$^2$ or more, bending loss is 50 dB/m or less, and a cutoff wavelength is provided that allows substantially single-mode propagation, when combined with a single-mode optical fiber for transmission in which, at a wavelength of 1.55 μm, effective area is 40 μm$^2$ or more, chromatic dispersion is positive, and a cutoff wavelength is provided that allows substantially single-mode propagation to form a hybrid transmission line, chromatic dispersion of the hybrid transmission line is −0.5 ps/nm/km or more and +0.5 ps/nm/km or less at a used wavelength band over a continuous range of at least 0.06 μm or more selected from a wavelength range of 1.45–1.63 μm, and when radii and relative refractive index differences of the central core portion, the intermediate core portion and the ring core portion based on the cladding are expressed as $(a,\Delta_1)$, $(b,\Delta_2)$ and $(c,\Delta_3)$, Respectively, conditions of (A) through (D) below are satisfied:

(A) $0.95 \leq \Delta_1 \leq 1.35$;

(B) $-3.5 \leq V2/V1 < 0$ and $0.5 \leq V3/V1 \leq 4.5$ when $V1 = \Delta_1$, $V2 = \Delta_2 \times \{(b/a)^2 - 1\}$ and $V3 = \Delta_3 \times \{(c/a)^2 - (b/a)^2\}$;

(C) α, expressed with $\alpha = -y\{x-1\}/\Delta_1$, is such that $0.10 \leq \alpha \leq 0.45$ when x=C-band, $y = \Delta_3/\Delta_2$; and, (D) the value resulting from dividing chromatic dispersion slope at a wavelength of 1.55 μm by chromatic dispersion is 0.0025 nm$^{-1}$ or more and 0.0035 nm$^{-1}$ or less.

2. A dispersion-compensating optical fiber according to claim 1 wherein, the effective area of said single-mode optical fiber for transmission at a wavelength of 1.55 μm is 70 μm$^2$ or more, and chromatic dispersion is +16 ps/nm/km or more and +22 ps/nm/km or less at a wavelength of 1.55 μm.

3. A dispersion-compensating optical fiber according to claim 2 wherein, the chromatic dispersion of a hybrid transmission line is −0.5 ps/nm/km or more and +0.5 ps/nm/km or less at a used wavelength band over a continuous range of at least 0.10 μm or more selected from a wavelength range of 1.45–1.63 μm.

4. A dispersion-compensating optical fiber according to claim 3 wherein, the chromatic dispersion of a hybrid transmission line is −0.2 ps/nm/km or more and +0.2 ps/nm/km or less at a used wavelength band over a continuous range of at least 0.10 μm or more selected from a wavelength range of 1.45–1.63 μm.

5. A dispersion-compensating optical fiber according to claim 1 wherein, at a wavelength of 1.55 μm, said single-mode optical fiber for transmission has an effective area of 40 μm$^2$ or more, positive chromatic dispersion, and a cutoff wavelength that substantially allows single-mode propagation.

6. A dispersion-compensating optical fiber according to claim 5 wherein, at a wavelength of 1.55 μm, said single-mode optical fiber for transmission has an effective area of 70 μm$^2$ or more, and chromatic dispersion of +16 ps/nm/km or more and +22 ps/nm/km or less.

7. A dispersion-compensating optical fiber wherein, a core and a cladding provided around an outer periphery of said core are provided, said core is provided with a central core portion having a refractive index higher than said cladding, an intermediate core portion provided around an outer periphery of said central core portion having a refractive index lower than said cladding, and a ring core portion provided around an outer periphery of said intermediate core portion having a refractive index higher than said cladding, at a wavelength of 1.55 μm, chromatic dispersion is −40 ps/nm/km or less and −65 ps/nm/km or more, chromatic dispersion slope is negative, effective area is 22.7 μm$^2$ or more, bending loss is 50 dB/m or less, and a cutoff wavelength is provided that allows substantially single-mode propagation, and single combined with a single-mode optical fiber for transmission in which, at a wavelength of 1.55 μm, effective area is 40 μm$^2$ or more, chromatic dispersion is positive, and a cutoff wavelength is provided that allows substantially single-mode propagation to form a hybrid transmission line, chromatic dispersion of the hybrid transmission line is −0.5 ps/nm/km or more and +0.5 ps/nm/km or less at a used wavelength band over a continuous range of at least 0.06 μm or more selected from a wavelength range of 1.45–1.63 μm.

* * * * *